United States Patent
Datta et al.

(10) Patent No.: US 7,585,917 B2
(45) Date of Patent: Sep. 8, 2009

(54) THERMOPLASTIC BLEND COMPOSITIONS

(75) Inventors: Sudhin Datta, Houston, TX (US); Michael Glenn Williams, Humble, TX (US); Narayanaswami Raja Dharmarajan, Houston, TX (US); Vetkav Rajagopalan Eswaran, Houston, TX (US); Rui Zhao, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 465 days.

(21) Appl. No.: 11/442,932

(22) Filed: May 30, 2006

(65) Prior Publication Data

US 2006/0281868 A1    Dec. 14, 2006

Related U.S. Application Data

(60) Provisional application No. 60/690,002, filed on Jun. 13, 2005.

(51) Int. Cl.
*C08L 23/00* (2006.01)
*C08L 23/04* (2006.01)
*C08L 23/10* (2006.01)
*C08L 23/16* (2006.01)

(52) U.S. Cl. .................................... 525/191; 525/240
(58) Field of Classification Search ................. 525/191, 525/240

See application file for complete search history.

(56) References Cited

U.S. PATENT DOCUMENTS

| | | | |
|---|---|---|---|
| 5,210,139 A * | 5/1993 | Huff et al. ............... | 525/194 |
| 6,207,756 B1 | 3/2001 | Datta et al. .............. | 525/191 |
| 6,245,856 B1 | 6/2001 | Kaufman et al. .......... | 525/240 |
| 6,288,171 B2 | 9/2001 | Finerman et al. .......... | 525/192 |
| 6,319,998 B1 | 11/2001 | Cozewith et al. ........... | 526/65 |
| 6,329,477 B1 | 12/2001 | Harrington et al. ......... | 526/65 |
| 6,545,088 B1 | 4/2003 | Kolthammer et al. ....... | 525/53 |
| 2005/0049670 A1 | 3/2005 | Jones et al. ............... | 623/1.12 |
| 2005/0054781 A1 | 3/2005 | Dharmarajan et al. ...... | 525/240 |
| 2005/0090571 A1 * | 4/2005 | Mehta et al. .............. | 521/56 |

FOREIGN PATENT DOCUMENTS

| EP | 0 601 790 | 6/1994 |
|---|---|---|
| WO | WO 98/27154 | 6/1998 |
| WO | WO 02/051634 | 7/2002 |
| WO | WO 03/040201 | 5/2003 |
| WO | WO2005049670 | 6/2005 |

* cited by examiner

*Primary Examiner*—Nathan M Nutter

(57) ABSTRACT

Described herein is a thermoplastic physical blend composition comprising (a) from 20 to 95 wt. % based on the total polymer content of a first polymer component that includes polypropylene having a melting point $(Tm) \geq 110°$ C.; and (b) from 80 to 5 wt. % based on the total polymer content of a second polymer component that includes a reactor blend obtainable from a solution process, the reactor blend including: (i) from 2 to 98 wt. % based on the total weight of the SPC of a propylene polymer having 60 wt. % or more units derived from propylene, including isotactically arranged propylene derived sequences and $Tm<105°$ C. or a Heat of Fusion$<45$ J/g, or both; and (ii) from 98 to 2 wt. % based on the total weight of the SPC of an ethylene α-olefin elastomer having either no crystallinity or crystallinity derived from ethylene, wherein (c) the FPC and the SPC are physically blended together to form the composition.

39 Claims, No Drawings

THERMOPLASTIC BLEND COMPOSITIONS

CROSS REFERENCE TO RELATED APPLICATION

This application claims the benefit of Provisional Application No. 60/690,002 filed Jun. 13, 2005, the disclosure of which is incorporated by reference.

FIELD OF THE INVENTION

This application relates to thermoplastic polymer compositions, including compositions conventionally referred to as TPOs (or when vulcanized, TPV). The invention relates especially but not exclusively to compositions in which a semi-crystalline polypropylene is physically blended with a reactor blend composition comprising a propylene-based elastomer.

BACKGROUND

Certain thermoplastic polymer compositions include at least two phases: a continuous (matrix) phase and a discontinuous (dispersed) phase distributed within the matrix phase. A variety of such compositions have been proposed or prepared, including but not limited to thermoplastic olefin compositions (TPOs) and thermoplastic vulcanizates (TPV).

TPOs are typically blends that include polypropylene, modifier and optionally non-polymeric components such as fillers and other compounding ingredients. TPOs are multiphase polymer blends in which the polypropylene forms a continuous matrix phase and the modifier component, frequently derived from an ethylene-containing interpolymer, is the dispersed component. The polypropylene matrix provides tensile strength and chemical resistance to the TPO, while the ethylene polymer imparts flexibility and impact resistance. Usually, the dispersed phase of a TPO is not, or only modestly, cross-linked.

Thermoplastic vulcanizates (TPVs), regarded herein as a type of TPO, are also blends of polypropylene, modifier and optionally non-polymeric components such as fillers and other compounding ingredients.

Thermoplastic vulcanizates (TPVs) may be characterized by finely divided rubber particles dispersed within a plastic matrix. These rubber particles are crosslinked to promote elasticity. As such, TPVs exhibit the processing properties of the plastic and the elasticity of the rubber. A TPV differs from other TPOs primarily in that the dispersed modifier component is crosslinked, preferably "vulcanized," to provide a rubber-like resilience to the composition. As a result of the increased coherence of the dispersed, crosslinked modifier, its share of the total composition is often increased to levels higher than for other TPOs. TPVs are conventionally produced by dynamic vulcanization. Dynamic vulcanization is a process whereby a rubber component is crosslinked or vulcanized within a blend of at least one non-vulcanizing polymer component while undergoing mixing or masticating at some elevated temperature. Preferably, the temperature of this curing step is greater than the melt temperature of the non-vulcanizing polymer component.

U.S. Pat. No. 6,245,856 describes a TPO comprising: a) 88 to 50 wt. % polypropylene, said polypropylene having a melt flow rate of 20 to 100 g/10 min, (ASTM D 1238, Condition L); b) at least 10 wt. % elastomer wherein said elastomer is selected from the group consisting of ethylene-$C_3$ to $C_{20}$ α-olefin elastomers and ethylene-$C_4$ to $C_{20}$ α-olefin-$C_4$ to $C_{20}$-diene elastomers; c) 2 to 15 wt. % of a compatibilizer having a number average molecular weight of 40,000 to 300,000 and comprising a ethylene-propylene copolymer having a propylene content of 80 to 92 wt. %. Component c) may be a propylene based elastomer and improves the performance of the composition. Such a TPO is a multiphase polymer blend in which the polypropylene a) forms a continuous matrix phase and the modifier component is the dispersed component. The polypropylene matrix tends to impart tensile strength and chemical resistance to the TPO, while the ethylene polymer tends to impart flexibility and impact resistance. In some cases the TPOs may have a dispersed phase which is not, or is only modestly, cross-linked. In other cases the impact modifying phase may be highly cross-linked permitting the use of higher amount of the elastomeric component and overall more rubbery characteristics. See U.S. Pat. No. 6,288,171. The dispersed modifier component is typically cross-linked or "vulcanized" to provide a rubber-like resilience to the composition, generally assisted by the presence of the diene in the impact modifying component. Neither of the aforementioned '856 or '171 patents disclose physically blending two polymer components one component being a reactor blend.

TPVs have been used to form composite structures for use in automotive, industrial, and consumer markets. Some of those uses require the adhesion of a TPV component to other materials to form a completed structure. Sufficient adhesion of which is difficult to obtain and difficult to maintain depending on the materials to be adhered, the adhering conditions, as well as the environment or conditions of use.

For example, WO 02/051634 discloses a two component composite structure where one of the polymer structures is made of EPDM blended with an effective amount of semicrystalline random adhesive copolymer, and the other polymer structure is made of a blend of dynamically vulcanized EPDM dispersed in a matrix of a thermoplastic polyolefin polymer. WO 02/051634 also discloses that the second polymer structure may be blended with the semicrystalline random adhesive copolymer. EP 0 601 790 discloses a two-layer sheet where each layer is made from an α-olefin copolymer rubber and a polyolefin resin. The first layer or "skin layer" is partially crosslinked, and the second layer or "back surface layer" is non-crosslinked. EP 0 601 790 discloses that the polyolefin resin is a homopolymer of ethylene or propylene, or copolymers of ethylene or propylene with small amounts of other polymeric monomers. Reactor blends comprising different polymeric species made either in a single polymerization zone using different catalysts or in separate polymerization zones, in which the species are mixed in solution before their separation from the polymerization diluent and formation of polymer pellet or bale have been described in U.S. Pat. Nos. 6,329,477; 6,319,998; 6,207,756; 6,545,088 and WO 03/040201.

None of those patents disclose physically blending the reactor blends with a polypropylene to form a new composition. Pellets formed from TPO or TPV compositions are often soft and tacky, and such properties are undesirable for storage and handling purposes. Also, there is an unfortunate tendency for the pellets to agglomerate, even when stored at ambient temperature. It would be desirable for pellets formed from a TPO or TPV composition to avoid such tackiness. It is among the objects of the invention to provide TPO and TPV composition which can be produced more economically and have an improved balance of properties.

SUMMARY

As described more fully below, a reactor blend is capable of providing a convenient source for impact modification in TPO and TPV compositions that permits an optimum use of a propylene elastomer compatibilizer and its complementary effect with an ethylene based elastomer in term of impact modification.

Described herein are various processes for forming physical blend compositions, including a process for forming a physical blend composition comprising (including): physically combining a first polymer component (FPC) that includes polypropylene having a melting point (Tm)≧110° C. with a second polymer component (SPC) that includes a reactor blend formed in a solution process, the reactor blend including: (i) a propylene polymer having 60 wt. % or more units derived from propylene, including isotactically arranged propylene derived sequences and Tm<105° C. or a Heat of Fusion<45 J/g, or both; and (ii) an ethylene α-olefin elastomer having either no crystallinity or crystallinity derived from ethylene, to form a physical blend comprising FPC and SPC.

Also disclosed are processes for forming a physical blend composition, comprising: a) forming in a solvent a propylene polymer having 60 wt. % or more units derived from propylene, including isotactically arranged propylene derived sequences and Tm<105° C. or a Heat of Fusion<45 J/g, or both; b) forming in a solvent an ethylene α-olefin elastomer having either no crystallinity or crystallinity derived from ethylene; c) forming in a solvent a product mixture that includes the propylene polymer and the ethylene elastomer; d) removing solvent from the product mixture to provide a second polymer component (SPC) that includes the propylene polymer and the ethylene elastomer; and e) supplying the SPC to be physically blended with a first polymer component (FPC) to form a physical blend composition that includes SPC and FPC, wherein the FPC includes polypropylene having a melting point (Tm)≧110° C.

Further, a process for forming a physical blend composition is disclosed, that includes: a) forming in a solvent a propylene polymer having 60 wt. % or more units derived from propylene, including isotactically arranged propylene derived sequences and Tm<105° C. or a Heat of Fusion<45 J/g, or both; b) forming in a solvent an ethylene α-olefin elastomer having either no crystallinity or crystallinity derived from ethylene; c) forming in a solvent a product mixture that includes the propylene polymer and the ethylene elastomer; d) removing solvent from the product mixture to provide a second polymer component (SPC) that includes the propylene polymer and the ethylene elastomer; e) physically combining the SPC with a first polymer component (FPC) that includes polypropylene having a melting point (Tm) ≧110° C. to form a physical blend composition comprising FPC and SPC; and f) forming pellets comprising the physical blend composition.

In addition, various thermoplastic physical blend compositions are disclosed, including a thermoplastic physical blend composition, comprising: a) from 20 to 95 wt. % based on the total polymer content of a first polymer component (FPC) that includes polypropylene having a melting point (Tm)≧110° C.; and b) from 80 to 5 wt. % based on the total polymer content of a second polymer component (SPC) that includes a reactor blend obtainable from a solution process, the reactor blend including: (i) from 2 to 98 wt. % based on the total weight of the SPC of a propylene polymer having 60 wt. % or more units derived from propylene, including isotactically arranged propylene derived sequences and Tm<105° C. or a Heat of Fusion<45 J/g, or both; and (ii) from 98 to 2 wt. % based on the total weight of the SPC of an ethylene α-olefin elastomer having either no crystallinity or crystallinity derived from ethylene, wherein the FPC and the SPC are physically blended together to form the composition.

As noted above, this patent also includes disclosure of various thermoplastic vulcanizate compositions, including a thermoplastic vulcanizate composition that comprises: a) from 20 to 95 wt. % based on the total polymer content of a first polymer component (FPC) that includes polypropylene having a melting point (Tm)≧11° C.; b) from 80 to 5 wt. % based on the total polymer content of a second polymer component (SPC) that includes a reactor blend obtainable from a solution process, the reactor blend including: (i) from 2 to 98 wt. % based on the total weight of the SPC of a propylene polymer having 60 wt. % or more units derived from propylene, including isotactically arranged propylene derived sequences and Tm<105° C. or a Heat of Fusion<45 J/g, or both; and (ii) from 98 to 2 wt. % based on the total weight of the SPC of an ethylene α-olefin elastomer having either no crystallinity or crystallinity derived from ethylene; c) a dispersed at least partially vulcanized rubber component; and d) an additive oil; wherein the FPC and the SPC are physically blended together.

DETAILED DESCRIPTION

A detailed description will now be provided, beginning with various definitions and properties, followed by an outline of specific embodiments, some of which are reflected in the claims, then separate discussions of certain aspects of the claimed compositions.

A. Definitions, Properties and Test Procedures:

Various terms as used herein are defined below. To the extent a term used in a claim is not defined below, it should be given the broadest definition persons in the pertinent art have given that term as reflected in at least one printed publication (e.g., a dictionary or article), issued patent or published application.

For purposes of convenience, various specific test procedures are identified for determining properties such as molecular weight, Mooney Viscosity, polydispersity (MWD), etc. All numerical values can be considered to be "about" or "approximately" the stated value, in view of the nature of testing in general.

Continuous. When used to describe a process or an aspect of a process, e.g., a process step, the term "continuous" and its derivatives, including "continuously," shall cover any process or step in which reagents and reacted products are supplied and removed continuously so that steady state, stable reaction conditions can be achieved.

Non-crystalline. The term "non-crystalline" shall mean atactic or amorphous, shall exclude isotactic or syndiotactic (as defined elsewhere herein), and shall also exclude any material that either has a measurable melting point (using a DSC procedure) without annealing, or develops a measurable melting point after annealing for one week (168 hours).

Polymer. Except as required by the particular context, the term "polymer" as used herein is the product produced by particular continuous polymerization in a particular polymerization zone or reactor.

Polymerization. As used herein, the term "polymerization" is to be given the broadest meaning used by persons skilled in the art refers to the conversion of monomer into polymer. Polymerization zone refers to the zone in which polymerization takes place and is generally formed by a back mixed reactor for forming a substantially random polymer.

Polysplit. As used herein, the term "polysplit" shall mean the calculated result of the weight of the first polymer (propylene polymer) that is produced from the first polymerization zone divided by the combined weight of the first polymer and the second polymer (ethylene polymer). The same definition applies equally to series and parallel reactor configurations. That is, the propylene polymer is always regarded as the numerator.

Melting Point, Heat of Fusion and Crystallization. The polymers and compositions described herein can be characterized in terms of their melting points (Tm) and heats of fusion, which properties can be influenced by the presence of comonomers or steric impurities that hinder the formation of crystallites by the polymer chains. The properties can be determined by Differential Scanning Calorimetry (DSC), using the ASTM E-794-95 (version E-794-01) procedure or the procedure disclosed in U.S. Pat. No. 6,747,114, column 8, lines 14-31, which patent is hereby incorporated by reference in its entirety.

Comonomer Content. The comonomer content and sequence distribution of the polymers can be measured using $^{13}C$ nuclear magnetic resonance (NMR) by methods well known to those skilled in the art. Comonomer content of discrete molecular weight ranges can be measured using methods well known to those skilled in the art, including Fourier Transform Infrared Spectroscopy (FTIR) in conjunction with samples by GPC, as described in Wheeler and Willis, Applied Spectroscopy, 1993, vol. 47, pp. 1128-1130. For a propylene ethylene copolymer containing greater than 75 wt. % propylene, the comonomer content (ethylene content) of such a polymer can be measured as follows: A thin homogeneous film is pressed at a temperature of about 150° C. or greater, and mounted on a Perkin Elmer PE 1760 infrared spectrophotometer. A full spectrum of the sample from 600 cm$^{-1}$ to 4000 cm$^{-1}$ is recorded and the monomer wt. % of ethylene can be calculated according to the following equation: Ethylene wt. %=$82.585-111.987X+30.045X^2$, where X is the ratio of the peak height at 1155 cm$^{-1}$ and peak height at either 722 cm$^{-1}$ or 732 cm$^{-1}$, whichever is higher. For propylene ethylene copolymers having 75 wt. % or less propylene content, the comonomer (ethylene) content can be measured using the procedure described in the Wheeler and Willis.

Tacticity. The term "tacticity" refers to the stereoregularity of the orientation of the methyl residues from propylene in a polymer. The "triad tacticity" of the polymers described herein can be determined from a $^{13}C$ nuclear magnetic resonance (NMR) spectrum of the polymer as described in U.S. Pat. Nos. 5,504,172, and 6,642,316, column 6, lines 38 through column 9, line 18, which patents are hereby incorporated by reference in their entirety.

Polyene content: The amount of the polyene present in the polymeric components can be inferred by the quantitative measure of the amount of the pendent free olefin present in the polymer after polymerization. Several procedures such as iodine number and the determination of the olefin content by $^1H$ or $^{13}C$ NMR have been established. In the particular case where the polyene is ENB the amount of polyene present in the polymers can be measured using ASTM D3900. The amount of polyene present is expressed on the basis of the total weight of (for example) ethylene and propylene derived units.

Tacticity Index. The tacticity index, expressed herein as "m/r", can be determined by $^{13}C$ nuclear magnetic resonance (NMR). The tacticity index m/r can be calculated as defined in H. N. Cheng, Macromolecules, 17, 1950 (1984).

Isotactic, Syndiotactic and Atactic. The term "atactic" when used herein shall be defined as referring to any polymer having a tacticity index of from 2.0 to 4.0. The term "syndiotactic" when used herein shall be defined as referring to any polymer having a tacticity index of from 1.0 up to (but not including) 2.0. The term "isotactic" when used herein shall be defined as referring to any polymer having a tacticity index above 4.0.

Molecular Weight Characteristics. Various molecular weight characteristics (e.g., Mw and Mn) and molecular weight distribution Mw/Mn (MWD) of the polymer components (or polymers) described herein can be measured in accordance with the procedures disclosed in U.S. Pat. No. 6,525,157, column 5, lines 1-44, which patent is hereby incorporated by reference in its entirety.

Mooney Viscosity. The term "Mooney Viscosity" is a term used to characterize certain polymers, polymer components, and polymer compositions herein. As used herein, the term Mooney Viscosity (ML (1+4) @ 125° C.), or simply "Mooney Viscosity,", is to be defined and measured according to the definition and measurement procedure set forth in U.S. Pat. No. 6,686,415, which is hereby incorporated by reference in its entirety, but particularly the text found in column 6, line 59 through column 7, line 59. Alternatively, any "Mooney Viscosity" value referenced herein (including those in the claims) is deemed to encompass any Mooney Viscosity measured in accordance with any recognized, published procedure for measuring Mooney Viscosity.

MFR. The term "MFR" as used herein stands for "Melt Flow Rate" and is used to characterize polymers, components and compositions. The units for "MFR" are grams per 10 minutes and the test to be herein for determining MFR is set forth in any version and condition set forth in ASTM-1238 that uses 2.16 kg. at 230° C.

Intermolecular solubility and composition distributions. Other characteristics that may be referenced in certain claims are "intermolecular solubility distribution" and "intermolecular composition distribution." Also, particularly with respect to certain embodiments of the first polymer, a "homogeneous distribution" as used herein is defined as a statistically insignificant intermolecular difference of both distributions in the composition of the copolymer and in the tacticity of the polymerized propylene. The definitions of those terms and the manner of calculating them are disclosed in U.S. Pat. No. 6,525,157, column 9, lines 30-41 and column 10, lines 16-53, which patent is hereby incorporated by reference in its entirety.

B. Specific Embodiments and Compositions.

One or more of the processes described above or elsewhere herein additionally comprise forming SPC pellets, which include some or all of the SPC, prior to physically combining the SPC with some or all of the FPC.

One or more of the processes described above or elsewhere herein, additionally comprise (a) forming SPC pellets, which include some or all of the SPC, prior to physically combining SPC with FPC, and (b) forming combination pellets, which include both SPC and FPC, after physically combining SPC with some or all of the FPC.

One or more of the processes described above or elsewhere herein, additionally comprise (a) forming SPC pellets, which include SPC, prior to physically combining SPC with FPC, and (b) forming combination pellets, which include both SPC and FPC, after physically combining SPC with FPC, wherein the SPC pellets are soft, having a flexural modulus (1% Secant)≦14.5 MPa (100 kpsi), or ≦13.1 MPa (90 kpsi), or ≦11.6 MPa (80 kpsi), or ≦10.2 MPa (70 kpsi), and the combination pellets are hard, having a flexural modulus (1% Secant)>14.5 MPa (100 kpsi), or >16.0 MPa (110 kpsi), or >17.4 MPa (120 kpsi), or >18.9 MPa (130 kpsi), or >20.3 MPa (140 kpsi).

One or more of the processes described above or elsewhere herein, additionally comprise (a) forming SPC pellets, which include SPC, prior to physically combining SPC with FPC, and (b) forming combination pellets, which include both SPC and FPC, after physically combining SPC with FPC, wherein both SPC pellets and the combination pellets are soft, having a flexural modulus (1% Secant)≦14.5 MPa (100 kpsi), or ≦13.1 MPa (90 kpsi), or ≦11.6 MPa (80 kpsi), or ≦10.2 MPa (70 kpsi).

One or more of the compositions described herein, the ethylene α-olefin elastomer is present in the reactor blend in an amount of more than 50 wt. % based on the total weight of the SPC.

In one or more of the compositions described herein, the SPC has two phases and is not homogeneous.

In one or more of the compositions described herein, the ethylene content of the ethylene α-olefin elastomer is 45% to 75 wt. %.

In one or more of the compositions described herein, the FPC is isotactic polypropylene homopolymer, a reactor copolymer, or an impact copolymer.

One or more of the compositions described herein, further comprises one or more other polymers, wherein the combination of the FPC and the SPC is present in the amount of from 80 to 100 wt. % of the blend composition based on the total polymer weight.

One or more of the compositions described herein, further comprises a filler, or a plasticizer, or both.

One or more of the compositions described herein, the FPC is present in the physical blend composition in an amount of 50 wt. % or more based on the total polymer content.

In one or more of the compositions described herein, the FPC is present in the physical blend composition in an amount of less than 50 wt. % based on the total polymer content.

In one or more of the compositions described herein, either the FPC or the SPC, or both, further include units derived from a diene.

In one or more of the compositions described herein, the propylene polymer of the SPC is an ethylene propylene copolymer having 60 wt. % or more units derived from propylene and 40 wt. % or less units derived from ethylene.

In one or more of the compositions described herein, the ethylene elastomer of the SPC is an amorphous ethylene propylene copolymer.

In one or more of the compositions described herein, the reactor blend is formed in a continuous series or parallel process.

Certain compositions are "hard," having a flexural modulus (1% secant)≦14.5 MPa (100 kpsi), or >16.0 MPa (110 kpsi), or >17.4 MPa (120 kpsi), or >18.9 MPa (130 kpsi), or >20.3 MPa (140 kpsi).

In one or more of those hard compositions, the FPC is present in the amount of 70 wt. % or more of the total polymers wherein the composition has an MFR≧25 g/10 min.

In one or more of those hard compositions, the SPC is present in the amount of 30 wt. % or less of the total polymers wherein the composition has an MFR≧25 g/10 min.

In one or more of those hard compositions, the propylene polymer is present in the amount of from 1 wt. % to 10 wt. % of the total polymers.

In one or more of those hard compositions, the ethylene elastomer is present in the amount of from 20 wt. % to 35 wt. % of the total polymers.

In one or more of those hard compositions, the MFR of the FPC≦50 g/10 min.

One or more of those hard compositions, having a Notched Izod @ 21° C.≧2.5.

Certain compositions are "soft," having a flexural modulus (1% secant)<4.5 MPa (100 kpsi), or ≦13.1 MPa (90 kpsi), or ≦11.6 MPa (80 kpsi), or ≦10.2 MPa (70 kpsi).

In one or more of those soft compositions, the FPC is present in the amount of from 40 wt. % to 70 wt. % of the total polymers wherein the composition has an MFR≦10 g/10 min.

In one or more of those soft compositions, the SPC is present in the amount of from 60 wt. % to 30 wt. % of the total polymers wherein the composition has an MFR≦10 g/10 min.

In one or more of those soft compositions, the propylene polymer is present in the amount of from 10 wt. % to 40 wt. % of the total polymers.

In one or more of those soft compositions, the ethylene elastomer is present in the amount of from 20 wt. % to 50 wt. % of the total polymers.

In one or more of those soft compositions, the MFR of the FPC≦50 g/10 min.

One or more of those soft compositions has a Tensile Strength of ≧0.1 MPa (1000 psi).

One or more of those soft compositions has a Hysterisis of ≦5%.

As noted above, this patent discloses TPV compositions. In one or more of those TPV compositions, the FPC and SPC are melt blended together to form pellets.

In one or more of those TPV compositions, the Shore A Hardness of the composition is 90 or below.

In one or more of those TPV compositions, the Shore A Hardness of the composition is above 90.

In one or more of those TPV compositions, the additive oil occupies less than 20 wt. % of the composition.

In one or more of those TPV compositions, the FPC includes isotactic polypropylene having a melting point greater than 110° C.

In one or more of those TPV compositions, the rubber component is ethylene-propylene-diene rubber.

In one or more of those TPV compositions, the composition is at least partially vulcanized.

Reactor Blends

One of the components or elements in certain compositions is a reactor blend. Described herein are reactor blend compositions (also referred to as "reactor blends") and processes (methods) for making reactor blends. The reactor blends include at least a first polymer (propylene polymer) and a second polymer (ethylene polymer), as discussed below. The term "reactor blend" is to be given the broadest meaning and/or scope that persons skilled in the art have given that term, as reflected in how the term has been used in at least one patent or printed publication. A preferred type of reactor blend is one that is formed in a series reactor (or "series reactors") which provide for consecutive or sequential polymerizations, although the term "reactor blend" itself also encompasses a blend formed in a single reactor, such as through the use of catalysts with multiple active sites.

Nevertheless, a "reactor blend" herein distinguished from a "physical blend," the latter being the combination of two or more polymers that have already been formed and recovered before being mixed or otherwise combined, e.g., separated (which would preferably also include being devolatilized) from some or all of the remaining polymerization mixture (e.g., unreacted monomers and/or solvent) and then combined together. On the other hand, in the case of series reactor processes, the reactor blend compositions are formed while polymerization is occurring, and such compositions can include different polymer components each of which can or may represent totally different polymers having different properties (e.g., an isotactic ethylene-propylene polymer or polymer component blended with an atactic EPDM polymer or polymer component).

The term "reactor blend" does not preclude (except to the extent stated otherwise) two components that have reacted to some extent or degree with one another, e.g., where one is a reaction product that is derived from the other, in whole or in part. Nor does the term "reactor blend" preclude two components that are mixed together but that can be separated by conventional means (e.g., fractionation) following formation and therefore can be identified as distinct polymers, e.g., a semicrystalline polymer having a distinct melting point (Tm) and an atactic or amorphous ethylene elastomer having either a low melting point (Tm) or no melting point.

The term "reactor blend" as used herein may in certain embodiments refer to a homogenous (e.g., a single phase) material while in other embodiments it may refer to a multiphase blend (e.g., two or more distinct phases). A blend formed by melt-blending is a physical blend.

The reactor blend compositions preferably include at least a propylene polymer and an ethylene polymer, although the ethylene polymer is in some cases identifiable by inference and/or by fractionation. In certain embodiments, the reactor blend includes a major portion by weight (more than 50 wt. %) propylene polymer with a minor portion (less than 50 wt. %) ethylene polymer, while in other embodiments, the reactor blend includes a major portion by weight (more than 50 wt. %) ethylene polymer with a minor portion (less than 50 wt. %) propylene polymer.

In certain embodiments of the reactor blend, the first polymer and second polymer form a substantially homogenous reactor blend, meaning that the first polymer and second polymer are part of, or are within, or occupy, the same phase. In other embodiments of the reactor blend, the first polymer and second polymer form distinct phases of a multiphase composition. In certain multiphase embodiments, a reactor blend includes a continuous phase (either the first polymer or the second polymer), which may be a dispersed phase (dispersion) and a discontinuous phase (either the first polymer or the second polymer), which may be a matrix phase. In those embodiments, either the continuous phase or the dispersed phase may represent a major portion of the reactor blend. Also, at least one embodiment of the reactor blend is a multiphase composition having a continuous phase that includes first polymer as a minor portion of the reactor blend and a dispersed phase that includes second polymer as a major portion. Further, in any of the above embodiments, the second polymer can be crosslinked. The various polysplit ranges identified above may be used.

D. Multistage Polymerization

The reactor blends described herein are formed in either batch or continuous "multistage polymerization," meaning that two (or more) different polymerizations (or polymerization stages) are conducted. More specifically, a multistage polymerization may involve either two or more sequential polymerizations (also referred to herein as a "series process"), or two or more parallel polymerizations (also referred to herein as a "parallel process").

The polymers made in the respective reactors of the continuous, multiple reactor solution plant are blended when in solution without prior isolation from the solvent. The blends may be the result of series reactor operation, where the effluent of a first reactor enters a second reactor and where the effluent of the second reactor can be submitted to finishing steps involving devolatilization. The blend may also be the result of parallel reactor operation where the effluents of both reactors are combined and submitted to finishing steps. Either option provides an intimate admixture of the polymers in the devolatilized blend. Either case permits a wide variety of polysplits to be prepared whereby the proportion of the amounts of polymers produced in the respective reactors can be varied widely.

The first polymer and second polymer making up the reactor blend composition are discussed below, followed by a section on the series process, and then a section on the parallel process. Pertinent differences between the series and parallel processes will be identified where appropriate, but otherwise the series process discussion should be regarded as equally applicable to parallel processes.

E. Propylene Polymer

As noted above, the reactor blends herein preferably include at least a propylene polymer, which is preferably the polymer formed by a first polymerization reaction (under conditions described elsewhere herein) and preferably in a "first reactor" as part of a series process or a parallel process.

The propylene polymer should have (at minimum) 50 wt. % propylene units, and preferably more, as noted below. The propylene polymer is preferably a polypropylene copolymer having 60 wt. % or more units derived from propylene, having isotactically arranged propylene derived sequences and having a heat of fusion less than 45 J/g. Also, the polypropylene copolymer preferably has at least 5 wt. % non-propylene comonomer units, e.g., ethylene units, and more preferably at least 10 wt. % or more ethylene units.

The propylene polymer preferably comprises>60 wt. %, more preferably>75 wt. % propylene-derived units. In some embodiments, the propylene polymer comprises from 75-95 wt. % of propylene-derived units, more preferably from 80-90 wt. % of propylene-derived units, the balance comprising one or more α-olefins. Other suitable embodiments include propylene derived units in an amount (based on the weight of propylene and α-olefin) ranging from about 75-93 wt. %, more preferably about 75-92.5 wt. %, more preferably about 75-92 wt. %, more preferably 75-92.5 wt. %, more preferably 82.5-92.5 wt. %, and more preferably about 82.5-92 wt. %. Corresponding α-olefin ranges include 5-25 wt. %, more preferably 7-25 wt. %, more preferably 7.5-25 wt. %, more preferably 7.5-17.5 wt. % and more preferably 8-17.5 wt. % (based on the weight of propylene and α-olefin). A preferred α-olefin is ethylene. The propylene polymer preferably has a MFR<about 800, more preferably<about 500, more preferably<about 200, more preferably<about 100, more preferably<about 50. Particularly preferred embodiments include a propylene polymer with an MFR of from about 1-25, more preferably about 1-20. The crystallinity of the first polymer should be derived from isotactic polypropylene sequences. The isotacticity of the propylene polymer can be illustrated by the presence of a preponderance of the propylene residues in the polymer in mm triads. As noted elsewhere herein, the tacticity of the propylene polymer is preferably greater than the tacticity of either the reactor blend or the ethylene polymer, e.g., where the propylene polymer is isotactic and the ethylene polymer is atactic.

The crystallinity of the propylene polymer can be expressed in terms of heat of fusion. The propylene polymer of the invention can have a heat of fusion, as determined by DSC, ranging from a lower limit of 1.0 J/g, or 1.5 J/g, or 3.0 J/g, or 4.0 J/g, or 6.0 J/g, or 7.0 J/g, to an upper limit of 30 J/g, or 40 J/g, or 50 J/g, or 60 J/g, or 75 J/g. Preferably, the heat of fusion of the propylene polymer is less than 45 J/g. Without wishing to be bound by theory, it is believed that the propylene polymer has generally isotactic crystallizable propylene sequences, and the above heats of fusion are believed to be due to the melting of these crystalline segments.

The level of crystallinity of the propylene polymer can also be reflected in its melting point. Preferably, the propylene polymer has a single melting point. However, a sample of propylene copolymer will often show secondary melting peaks adjacent to the principal peak. The highest peak is considered the melting point. The propylene polymer described herein can have a melting point by DSC within the range having an upper limit of 115° C., or 110° C., or 105° C., or 90° C., or 80° C., or 70° C., and a lower limit of 0° C., or 20° C., or 25° C., or 30° C., or 35° C., or 40° C., or 45° C. Preferably, the propylene polymer has a melting point of less than 105° C., and more preferably less than 100° C., and even more preferably less than 90° C. Also, it is preferred that the propylene polymer have a melting point greater than about 25° C., or 40° C.

For the propylene polymer, at least 75% by weight of the polymer, or at least 80% by weight, or at least 85% by weight, or at least 90% by weight, or at least 95% by weight, or at least 97% by weight, or at least 99% by weight of the polymer is soluble in a single temperature fraction, or in two adjacent temperature fractions, with the balance of the polymer in immediately preceding or succeeding temperature fractions. These percentages are fractions, for instance in hexane, beginning at 23° C. and the subsequent fractions are in approximately 8° C. increments above 23° C. Meeting such a fractionation requirement means that a polymer has statistically insignificant intermolecular differences of tacticity of the polymerized propylene.

In certain embodiments, the percentage of mm triads in the propylene polymer, as determined by the method for determining triad tacticity, is in the range having an upper limit of 98%, or 95%, or 90%, or 85%, or 82%, or 80%, or 75%, and a lower limit of 50%, or 60%.

Certain propylene polymers have an isotacticity index greater than 0%, or within the range having an upper limit of 50%, or 25% and a lower limit of 3%, or 10%.

Certain propylene polymers can have a tacticity index (m/r) within the range having an upper limit of 800, or 1000, or 1200, and those polymers may have a lower limit of 40, or 60.

As noted below, the first polymerization (and also second polymerization) may in certain cases be conducted in the presence of an α-olefin; thus the resulting polymer formed when such α-olefin is present will include "units derived" from such α-olefin. Either the same α-olefin or different α-olefins can be introduced to the first and second polymerizations. Particular examples of those α-olefins are $C_3$-$C_{20}$ α-olefins, include, but are not limited to propylene; butene-1; pentene-1,2-methylpentene-1,3-methylbutene-1; hexene-1, 3-methylpentene-1,4-methylpentene-1,3,3-dimethylbutene-1; heptene-1; hexene-1; methylhexene-1; dimethylpentene-1 trimethylbutene-1; ethylpentene-1; octene-1; methylpentene-1; dimethylhexene-1; trimethylpentene-1; ethylhexene-1; methylethylpentene-1; diethylbutene-1; propylpentane-1; decene-1; methylnonene-1; nonene-1; dimethyloctene-1; trimethylheptene-1; ethyloctene-1; methylethylbutene-1; diethylhexene-1; dodecene-I and hexadodecene-1.

The propylene polymer may optionally include a polyene. The optional polyene may be any hydrocarbon structure having at least two unsaturated bonds wherein at least one of the unsaturated bonds is readily incorporated into a polymer. Examples of the optional polyene include, but are not limited to butadiene, pentadiene, hexadiene (e.g., 1,4-hexadiene), heptadiene (e.g., 1,6-heptadiene), octadiene (e.g., 1,7-octadiene), nonadiene (e.g., 1,8-nonadiene), decadiene (e.g., 1,9-decadiene), undecadiene (e.g., 1,10-undecadiene), dodecadiene (e.g., 1,11-dodecadiene), tridecadiene (e.g., 1,12-tridecadiene), tetradecadiene (e.g., 1,13-tetradecadiene), pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, and polybutadienes having a molecular weight ($M_w$) of less than 1000 g/mol. Examples of straight chain acyclic dienes include, but are not limited to 1,4-hexadiene and 1,6-octadiene. Examples of branched chain acyclic dienes include, but are not limited to 5-methyl-1,4-hexadiene, 3,7-dimethyl-1,6-octadiene, and 3,7-dimethyl-1,7-octadiene. Examples of single ring alicyclic dienes include, but are not limited to 1,4-cyclohexadiene, 1,5-cyclooctadiene, and 1,7-cyclododecadiene. Examples of multi-ring alicyclic fused and bridged ring dienes include, but are not limited to tetrahydroindene; norbornadiene; methyl-tetrahydroindene; dicyclopentadiene; bicyclo-(2.2.1)-hepta-2,5-diene; and alkenyl-, alkylidene-, cycloalkenyl-, and cylcoalkyliene norbonenes [including, e.g., 5-methylene-2-norbornene, 5-ethylidene-2-norbornene, 5-propenyl-2-norbornene, 5-isopropylidene-2-norbornene, 5-(4-cyclopentenyl)-2-norbornene, 5-cyclohexylidene-2-norbornene, and 5-vinyl-2-norbornene]. Examples of cycloalkenyl-substituted alkenes include, but are not limited to vinyl cyclohexene, allyl cyclohexene, vinyl cyclooctene, 4-vinyl cyclohexene, allyl cyclodecene, vinyl cyclododecene, and tetracyclo (A-11,12)-5,8-dodecene.

Any propylene polymer that includes ethylene units is considered to have statistically insignificant intermolecular differences of composition, which is the ratio of propylene to ethylene between different chains (intermolecular). This compositional analysis is by infrared spectroscopy of the fractions of the polymer obtained by the controlled thermal dissolution procedure described above. Each of the fractions has a composition (wt. % ethylene content) with a difference of less than 1.5 wt. % (absolute) or less than 1.0 wt. % (absolute), or less than 0.8 wt. % (absolute) of the average wt. % ethylene content of the whole polymer. Meeting such a fractionation requirement means that a polymer has statistically insignificant intermolecular differences of composition. For procedure see the article in Macromolecules, Vol. 26, p. 2064 (1993).

Any propylene polymer that contains ethylene preferably has statistically insignificant intramolecular differences of composition, which is the ratio of propylene to ethylene along the segments of the same chain (intramolecular). This compositional analysis is inferred from the process used for the synthesis of these polymers, and can also be determined by $^{13}C$ NMR, which locates the comonomer residues and propylene insertion errors in relation to the neighboring propylene residues.

The propylene polymer also preferably has statistically insignificant intramolecular differences of tacticity, which is due to isotactic orientation of the propylene units along the segments of the same chain (intramolecular). This compositional analysis is inferred from the results of a detailed analysis which includes differential scanning calorimetry, electron microscopy and relaxation measurement. In the presence of significant intramolecular differences in tacticity, we would form 'stereoblock' structures, as described below, where the number of isotactic propylene residues adjacent to one another is much greater than statistical. Further, the melting point of these polymers depends on the crystallinity, since the more blocky polymers should have a higher melting point as well as depressed solubility in room temperature solvents.

F. Ethylene Polymer

The reactor blends described herein include a second polymer component (second polymer), which preferably is (or includes) an elastomer that is predominantly ethylene, i.e., having more than 30 wt. % or 40 wt. %, or 50 wt. % units derived from ethylene monomer. The crystallinity, and hence other properties as well, of the second polymer are preferably different from those of the first polymer.

Preferably, the second polymer (also referred to as the "ethylene polymer") is non-crystalline, e.g., atactic or amorphous, but in certain embodiments the second polymer is crystalline (including "semi-crystalline"). But any crystallinity of the second polymer is preferably derived from the ethylene, and a number of published methods, procedures and techniques are available for evaluating whether the crystallinity of a particular material is derived from ethylene. The crystallinity of the second polymer can be distinguished from the crystallinity of the first polymer by removing the first polymer from the composition and then measuring the crystallinity of the residual second polymer. Such crystallinity measured is usually calibrated using the crystallinity of polyethylene and related to the comonomer content. The percent crystallinity in such cases is measured as a percentage of polyethylene crystallinity and thus the origin of the crystallinity from ethylene is established.

Preferably, in addition to units derived from ethylene, the second polymer also includes units derived from an α-olefin monomer, which in certain embodiments is the same as the α-olefin monomer used in forming the first polymer, and in other embodiments is different from the α-olefin monomer used in forming the first polymer, in which case it is referred to as a "second α-olefin." Any of the α-olefin monomers listed above in the context of the first polymer can be used, particularly butene, pentene, hexene, heptene, or octene. Advantageously, the second polymer can be formulated using different α-olefin monomers, selected from the list above for the first polymer, and/or different amounts of monomers, e.g., ethylene and α-olefin monomers, to prepare different types of second polymers, e.g., ethylene elastomers having desired properties. Accordingly, a blend composition can be prepared in which the composition includes a first polymer having one set of properties and a second polymer having a different set of properties, so that the composition has the desired mix or balance of desired properties. Advantageously, a continuous multistage process (series or parallel) can be used to form that composition, without the need to apply any separation step, e.g., removal of solvents, e.g., by devolatalization, or without any need to physically combine polymers after separation.

Preferably, the second polymer is formed during (or by) the second polymerization, which in the case of series reactors is preferably conducted in a reactor positioned downstream of the reactor in which the first polymerization is conducted, in which most of the first polymer is formed. In the case of a parallel process, involving parallel polymerization and/or parallel reactors, the "second polymer" may be formed at the same time as the "first polymer," but the product streams (still including solvent) are combined after the first and second polymers are sufficiently formed.

Preferably, the second polymer includes (or is) an elastomeric polymer, which is preferably an ethylene-α-olefin elastomer (including ethylene-cyclic olefin and ethylene-α-olefin-diolefin) having high molecular weight (as measured by Mooney Viscosity) and low crystallinity. The second polymer can be prepared utilizing any appropriate catalyst, but preferably the catalyst described below. In at least one specific embodiment, the second polymer is formed in the presence of a catalyst (e.g., the "second catalyst") that is different from the catalyst used for polymerizing the first polymer (e.g., the "first catalyst"). Any number of second polymers having a selected composition (e.g., monomer type and content) and properties can be formed.

One purpose of the first polymer is to enhance the attributes of the second polymer. Such enhancements can manifest themselves in a variety of ways depending on the specific application and the specific blend contemplated. Such enhancements include, but are not limited to, improvements in cure rate and state; processability as defined by such processes as milling, extrusion, calendering and injection molding; physical properties such as toughness, tack, adhesion, tear resistance, tensile and elongation and heat aging as defined by the retention of such physical properties at elevated temperatures.

For example, any one of the ethylene, α-olefin, vinyl norbornene elastomers described in U.S. Pat. No. 6,376,610, or any of such elastomers incorporating ENB as the polyene, primarily intended for use in a power cable coating compound, can be formed as a second polymer. The portions of that patent describing the elastomers, their properties, and methods for making them, are hereby incorporated by reference for purposes of U.S. patent practice.

Also, any of the ethylene, α-olefin elastomeric polymer compositions described in U.S. Pat. No. 6,271,311, or any of such elastomers incorporating ENB as the polyene, which are primarily intended to be formed into extruded articles, can be formed as a second polymer. The portions of that patent describing the elastomers, their properties, and methods for making them, are hereby incorporated by reference for purposes of U.S. patent practice.

Further, a second polymer can be any of the ethylene, α-olefin, vinyl norbornene elastomers described in U.S. Pat. No. 5,807,946, or any of such elastomers incorporating ENB as the polyene, primarily intended for use in vehicle parts. The portions of that patent describing the elastomers, their properties, and methods for making them, are hereby incorporated by reference for purposes of U.S. patent practice.

Additionally, any of the ethylene, α-olefins, vinyl norbornene elastomers described in U.S. Pat. No. 5,766,713, or any of such elastomers incorporating ENB as the polyene, primarily intended for use in vehicle hoses, can be formed as a second polymer. The portions of that patent describing the elastomers, their properties, and methods for making them, are hereby incorporated by reference for purposes of U.S. patent practice.

Also, any of the ethylene, α-olefin, vinyl norbornene elastomers described in U.S. Pat. No. 5,698,650, or any of such elastomers incorporating ENB as the polyene, primarily intended for use in vehicle brake parts and power transmission belts, can be formed as a second polymer. The portions of that patent describing the elastomers, their properties, and methods for making them, are hereby incorporated by reference for purposes of U.S. patent practice.

Furthermore, any of the ethylene, α-olefin, vinyl norbornene elastomers described in U.S. Pat. No. 5,656,693, or any of such elastomers incorporating ENB as the polyene, having improved cure properties, can be formed as a second polymer. The portions of that patent describing the elastomers, their properties, and methods for making them, are hereby incorporated by reference for purposes of U.S. patent practice.

Also, any of the ethylene, α-olefin, non-conjugated bicyclic diene elastomeric polymers described in U.S. Pat. No.

5,654,370, or any of such elastomers incorporating ENB as the polyene, which can then be compounded and calendered into a sheet, can be formed as a second polymer. The portions of that patent describing the elastomers, their properties, and methods for making them, are hereby incorporated by reference for purposes of U.S. patent practice.

Finally, any of the ethylene, α-olefin, vinyl norbornene elastomers described in U.S. Pat. No. 5,571,883, or any of such elastomers incorporating. ENB as the polyene, which can be used to form motor vehicle vibration damping parts, can be formed as a second polymer. The portions of that patent describing the elastomers, their properties, and methods for making them, are hereby incorporated by reference for purposes of U.S. patent practice.

Therefore, as exemplified in the above patents, the second polymer can include one or more optional polyenes, including particularly a diene; thus, the second polymer can be an ethylene-propylene-diene (commonly called "EPDM"). The optional polyene is considered to be any hydrocarbon structure having at least two unsaturated bonds wherein at least one of the unsaturated bonds is readily incorporated into a polymer. The second bond may partially take part in polymerization to form long chain branches but preferably provides at least some unsaturation bonds suitable for subsequent curing or vulcanization in post polymerization processes. Examples of the optional polyene include, but are not limited to butadiene, pentadiene, hexadiene (e.g., 1,4-hexadiene), heptadiene (e.g., 1,6-heptadiene), octadiene (e.g., 1,7-octadiene), nonadiene (e.g., 1,8-nonadiene), decadiene (e.g., 1,9-decadiene), undecadiene (e.g., 1,10-undecadiene), dodecadiene (e.g., 1,11-dodecadiene), tridecadiene (e.g., 1,12-tridecadiene), tetradecadiene (e.g., 1,13-tetradecadiene), pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, and polybutadienes having a molecular weight ($M_w$) of less than 1000 g/mol. Examples of straight chain acyclic dienes include, but are not limited to 1,4-hexadiene and -1,6-octadiene. Examples of branched chain acyclic dienes include, but are not limited to 5-methyl-1,4-hexadiene, 3,7-dimethyl-1,6-octadiene, and 3,7-dimethyl-1,7-octadiene. Examples of single ring alicyclic dienes include, but are not limited to 1,4-cyclohexadiene, 1,5-cyclooctadiene, and 1,7-cyclododecadiene. Examples of multi-ring alicyclic fused and bridged ring dienes include, but are not limited to tetrahydroindene; norbomadiene; methyl-tetrahydroindene; dicyclopentadiene; bicyclo-(2.2.1)-hepta-2,5-diene; and alkenyl-, alkylidene-, cycloalkenyl-, and cylcoalkyliene norbomenes [including, e.g., 5-methylene-2-norbornene, 5-ethylidene-2-norbornene, 5-propenyl-2-norbornene, 5-isopropylidene-2-norbornene, 5-(4-cyclopentenyl)-2-norbornene, 5-cyclohexylidene-2-norbornene, and 5-vinyl-2-norbornene]. Examples of cycloalkenyl-substituted alkenes include, but are not limited to vinyl cyclohexene, allyl cyclohexene, vinyl cyclooctene, 4-vinyl cyclohexene, allyl cyclodecene, vinyl cyclododecene, and tetracyclo (A-11,12)-5,8-dodecene.

G. Series Process

As noted above, one form of multistage polymerization is a series process (e.g., series reactor process). Preferably, in a series process, involving sequential polymerizations, two (or more) reactors are connected to one another in "series" via a conduit (e.g., piping) so that material exiting one reactor (e.g., effluent) is fed to the other reactor, although valves or other components may be interposed between the two reactors. Sometimes the two (or more) series reactors are referred to as a single "series reactor."

Disclosed herein are continuous processes for making an elastomer composition that comprises a propylene polymer and a second polymer, the process comprising: polymerizing in a first polymerization zone in a solvent a feed of a first monomer system and a first catalyst system capable of providing isotactic stereoregularity to sequences of propylene derived units to provide a mixture of the polymer and unreacted monomers, said propylene polymer having 60 wt. % or more units derived from propylene, including isotactically arranged propylene derived sequences and further having a heat of fusion less than 45 J/g or a melting point less than 105° C. or both and a Mooney Viscosity (ML (1+4) @ 125° C.) of from 1 to 45; and polymerizing in a second polymerization zone in a solvent a combined feed of the first polymer mixture, a second monomer system and a second catalyst system to provide a mixture that includes the propylene polymer and a ethylene polymer, said ethylene polymer preferably being a random copolymer of ethylene and propylene derived units, wherein the ethylene polymer is either noncrystalline or has ethylene-type crystallinity; wherein: the overall composition has a combined Mooney (ML 1+4 at 125° C.) of from 25 to 180 and a heat of fusion less than 50 J/g.

Also disclosed herein are continuous processes for making an elastomer composition having a Mooney Viscosity (ML (1+4) @ 125° C.) of from 16 to 180, the composition including a propylene polymer and an ethylene polymer, the process comprising: (a) conducting a first polymerization in a first reactor at a first temperature in the presence of a first reactant feed to provide a first effluent that includes a propylene polymer; (b) continuously directing some or all of the first effluent to a second reactor, in which a second polymerization is conducted at a second temperature in the presence of a second reactant feed to provide a reactor blend; wherein: (c) the first reactant feed includes a solvent, a first catalyst and a first monomer set that includes propylene and one or both of ethylene and a first α-olefin; (d) the second reactant feed includes a solvent, a second catalyst, at least a portion of the propylene polymer and a second monomer set that includes ethylene and a second α-olefin; (e) the propylene polymer is an elastomeric random copolymer of propylene and ethylene having a content of propylene derived units of at least 60 wt. % and including isotactically arranged propylene derived sequences and having a heat of fusion of less than 45 J/g or a melting point less than 105° C.; (f) the reactor blend is a polymer composition that includes a reaction product of some or all of the polymer produced from the second reactant feed.

Preferably, the series process is a continuous solution polymerization process that involves continuously directing materials through a sequential train of reactors (series reactors). The train of reactors includes at least two polymerization reactors connected in series (i.e., sequentially) where the individual propylene polymer and ethylene polymer are made in the separate reactors. A first reactor can be operated to polymerize the propylene polymer in solution. The reactor effluent from the first reactor is then introduced, in whole or in part, to a second reactor which is operated to polymerize the ethylene polymer. This arrangement ensures that the ethylene polymer, made in the second reactor, is made in the presence of the propylene polymer, which is made in the first reactor. It will be recognized, of course, that because the reactants in the polymerization in the second reactor include both monomers and a fully formed propylene polymer, the polymerization product from (or in) the second reactor (which is or includes a "reactor blend composition") may include not only the ethylene polymer but also one or more polymer species that include or have incorporated therein a "propylene polymer" a "ethylene polymer," but do not fall neatly into the category of either a "propylene polymer" or a "ethylene polymer" according to any of the definitions herein. It is noted, however, that the "ethylene polymer" can nevertheless be separately identified using any of a number of recognized analytical methods and techniques, whether by direct measurement or calculation.

In general, except as noted otherwise, polymerization in each reactor may be conducted by any of the polymerization procedures known in the art, including making adjustments as needed or desired based on the circumstances and equipment being used. However, it is preferred that the polymerization be conducted under conditions where the reactants and products are completely in solution. These polymerization conditions can be obtained by using a solvent, in sufficient quantities, common to both of the polymeric components as the polymerization medium at suitable reaction conditions, including temperature and pressure, such that all of the components of the polymer mixture are maintained in solution.

CFSTR. A particularly preferred arrangement is a train of at least two continuous flow stirred tank reactors (CFSTR) connected in series. The physical structures and construction of such arrangement per se can be conventional. However, each reactor should be capable of being fed independently with monomer, solvent, catalyst, etc. In addition, the agitation provided to qualify as a CFSTR should be vigorous enough to avoid unmixed zones in the reactor. Such design considerations of CSFTR are well known to a skilled person in the art. It may be desirable to remove polar compounds that act as catalyst poisons. All solvent and monomer feeds can be purified over molecular sieves, alumina beds, or other absorbents as known in the art. In preferred embodiments, heat is removed from each reactor during polymerization. Heat removal can be accomplished by methods well known in the art such as auto-refrigeration, feed prechilling (adiabatic reactors), cooling coils, or various combinations of these techniques. Adiabatic reactors with prechilled feeds are preferred.

Polymerization Temperatures. An important feature of the process of forming the reactor blends herein is the different temperatures at which the different reactions (polymerizations) are conducted. Temperatures can be measured at one or several points within the reactor using one or several temperature probes, using equipment and procedures known to persons skilled in the art. In certain embodiments described herein, the second polymerization temperature (e.g., temperature in the second reactor) is higher than the first polymerization temperature (e.g., temperature in the first reactor). Those temperatures are specified above, as part of the specific embodiments.

Reaction Pressures. Pressure in each reactor should be sufficient to keep the reactor contents in solution at the selected reactor temperature. Preferably, the first polymerization (e.g., polymerization conducted in a first reactor) and the second polymerization (e.g., polymerization conducted in a second reactor) is "maintained" at a particular level or range, meaning that the polymerization pressure is kept substantially constant during production of at least a particular propylene polymer and/or reactor blend, although it is understood that during continuous polymerization cycles there may be periodic adjustments, e.g., during startup or maintenance sessions. Although other pressures or pressure ranges may in certain cases be utilized, it is preferred that the first polymerization is conducted at a pressure ranging from a low of 2100 kPa, or 1750 kPa, or 1400 kPa, or 1050 kPa, or 700 kPa, to a high of 14,700 kPa, or 13,300 kPa, or 12,600 kPa, or 11,900 kPa, or 11,200 kPa. It is preferred that the second polymerization (which in certain embodiments is set at the same level as the first polymerization, or within the same specified range) is conducted at a pressure ranging from a low of 2100 kPa, or 1750 kPa, or 1400 kPa, or 1050 kPa, or 700 kPa, to a high of 14,700 kPa, or 13,300 kPa, or 12,600 kPa, or 11,900 kPa, or 11,200 kPa.

Residence Times. As used herein, the term "residence time" means the average time during which reactants for a particular polymerization are present together with catalyst in a particular reactor. This is calculated by dividing the reactor volume by total volumetric flow rate. The residence time per reactor is dependent on many factors, including the size of the reactor. An example of residence time for each reactor is from 1 to 180 minutes; or more narrowly from 5 to 30 minutes. Although other residence times or ranges of residence times may in certain cases be utilized, it is preferred that the first residence time range from a low of 4 minutes, or 5 minutes, or 6 minutes, or 7 minutes, or 8 minutes, or 9 minutes, to a high of 100 minutes, or 90 minutes, or 80 minutes, or 70 minutes, or 60 minutes, or 50 minutes. It is preferred that the second residence time range from a low of 4 minutes, or 5 minutes, or 6 minutes, or 7 minutes, or 8 minutes, or 9 minutes, to a high of 30 minutes, or 25 minutes, or 20 minutes, or 15 minutes, or 12 minutes, or 10 minutes.

Monomers. The monomers used in both polymerizations are set forth elsewhere herein, and are determined based on the desired composition of the particular polymer that is being formed. The monomers may include, for example, ethylene ($C_2$) and α-olefins, including higher α-olefins ($C_4$-$C_{20}$), as well as polyenes, e.g., non-conjugated dienes. A particularly useful α-olefin is propylene, although other higher α-olefins may be used as set forth elsewhere herein.

Solvents. As noted above, a preferred method involves solution polymerization, which requires a solvent. Examples of solvent that can be used in the first and second polymerizations described herein (e.g., introduced to the first and second reactors) are hydrocarbons such as aliphatics, cycloaliphatics, and aromatic hydrocarbons. Preferred solvents are $C_{12}$ or lower straight-chain or branched-chain, saturated hydrocarbons, and $C_5$ to $C_9$ saturated alicyclic or aromatic hydrocarbons. Examples of such solvents are hexane, butane, pentane, heptane, cyclopentane, cyclohexane, cycloheptane, methyl cyclopentane, methyl cyclohexane, isooctane, benzene, toluene and xylene. Hexane is preferred. Preferably, the same solvent is used in both polymerizations, e.g., in both reactors, and is recycled, as discussed below.

Effluent Streams. As discussed elsewhere herein, during operation of the continuous process, each reactor experiences polymerization that produces an effluent stream. That effluent stream can be composed of polymer produced from the polymerization as well as catalyst and any unreacted monomers. Each effluent stream can be characterized as having a particular polymer concentration. As an example, the polymer concentration in the effluent of each reactor can be maintained in the range of 1 to 30% by weight or between 3 to 20% by weight, based on the total weight of the particular effluent. As exemplified in the examples below, involving a series reactor configuration, the polymer concentration of the first effluent preferably represents the propylene polymer only (which can be measured, for example, by separating the formed polymer from non-polymer materials). In contrast, the polymer concentration of the second effluent represents all the polymer material present in the second reactor, measured at a given time, e.g., after a particular residence time or some other set point. That polymer material includes at least the reactor blend, which may include a certain amount of the propylene polymer together with at least one other polymer, e.g., a polymer that is either a reaction product of the first polymer together with other reactants present during the second polymerization, or a reaction product of the other reactants themselves, e.g., the monomers, or both forms of reactant product). Although other polymer concentrations or ranges of concentrations may in certain cases be utilized, it is preferred that the first effluent polymer concentration range from a low of 1 wt. %, or 2 wt. %, or 3 wt. %, or 4 wt. %, or 5 wt. %, or 6 wt. %, to a high of 30 wt. %, or 25 wt. %, or 20 wt. %, or 16 wt. %, or 12 wt. %, or 8 wt. %. It is preferred that the second effluent polymer concentration range from a low of 3 wt. %, or 4 wt. %, or 5 wt. %, or 6 wt. %, or 7 wt. %, or 8 wt. %, to a high of 30 wt. %, or 25 wt. %, or 20 wt. %, or 18 wt. %, or 16 wt. %, or 14 wt. %.

Polymer Recovery. A polymer can be recovered from either effluent (e.g., the effluent from the first reactor or the effluent from the second reactor), by separating the polymer from other constituents of the effluent. Conventional separation means may be employed. For example, polymer can be recovered from effluent by coagulation with a nonsolvent such as isopropyl alcohol, acetone, or n-butyl alcohol, or the polymer can be recovered by stripping the solvent or other media with heat or steam. One or more conventional additives such as antioxidants can be incorporated in the polymer during the recovery procedure. Possible antioxidants include phenyl-beta-naphthylamine; di-tert-butylhydroquinone, triphenyl phosphate, heptylated diphenylamine, 2,2'-methylene-bis(4-methyl-6-tert-butyl)phenol, and 2,2,4-trimethyl-6-phenyl-1,2-dihydroquinoline. Other methods of recovery such as by the use of LCST followed by devolatilization are also envisioned.

Polymerization Rates. For an adiabatic reactor using feed chilling as the method of heat removal, the overall polymerization rate is set by the difference between the temperature of the second reactor and the feed temperature. Since refrigeration is limited by the availability of commercial refrigeration units that are capable of chilling the feed to about −40° C., the economics is driven by the highest temperature at which the second reactor can be operated and still produce the polymer with desired properties such as molecular weight and long chain branching. Thus, it is desirable to operate the second reactor at substantially higher temperature than the first. Other factors that influence polymerization rate (also called production rate) are solvent type and rate, monomer type and polymer composition since the heat of polymerization varies with the choice of monomer.

Molecular Weight. The molecular weight characteristics (e.g., Mw, Mn, etc.) of the reactor blend and also of the individual propylene polymer and ethylene polymer can in certain circumstances be adjusted depending upon the desired properties of the reactor blend. Those molecular weight characteristics are described elsewhere herein. For example, the molecular weight characteristics of each polymer can be set by choosing the reactor temperature, monomer concentration, and by optionally adding chain transfer agents such as hydrogen. Also, molecular weight can generally be lowered by increasing reaction temperatures, and raised by increasing monomer concentrations.

H. Parallel Process

Another form of multistage polymerization is a parallel process (parallel polymerization).

Disclosed herein are continuous processes for making an elastomeric composition that comprises a propylene polymer and an ethylene polymer, the process comprising: polymerizing in a first polymerization zone in a solvent a feed of a first monomer system and a first catalyst system capable of providing isotactic stereoregularity to sequences of propylene derived units to provide a mixture of the propylene polymer and unreacted monomers, said propylene polymer preferably having 60 wt. % or more units derived from propylene, including isotactically arranged propylene derived sequences and further having a heat of fusion less than 45 J/g or a melting point less than 105° C. or both and a Mooney Viscosity (ML (1+4)@ 125° C.) of from 1 to 45; polymerizing in a second polymerization zone in a solvent a combined feed of a second monomer system and a second catalyst system to provide a mixture that includes the ethylene polymer, said ethylene polymer preferably being a random copolymer of ethylene and propylene derived units, wherein the ethylene polymer is either noncrystalline or has ethylene-type crystallinity; and combining in the presence of the solvent the propylene polymer and the ethylene polymer wherein the combination of the propylene polymer and the ethylene polymer has a Mooney (ML 1+4 at 125° C.) of from 25 to 180 and a heat of fusion less than 50 J/g.

In one example of a parallel process, two reactors are configured such that monomers, catalyst(s) and solvent are fed independently to each reactor. Note that the terms "first" and "second" do not imply any particular order or sequence, but the terminology is used for convenience so that all references herein to the word "first" (polymer, polymerization, catalyst, reactor, etc.) can apply equally to both the series and parallel processes, unless stated otherwise. In fact, the first and second polymerizations are preferably taking place simultaneously in a parallel process. The input (feed) for the first polymerization (preferably taking place in the first reactor) is the same as the feed described above in the first polymerization of the series process, and includes, for example, monomers (propylene and one or both of ethylene and α-olefin monomer), catalyst mixture and solvent. The output or effluent (e.g., polymerization product) is also typically the same as the effluent of the first polymerization in the series process, e.g., propylene polymer, catalyst, solvent and unreacted monomer, e.g., propylene monomer. Preferably, both the first and second polymerizations utilize propylene and ethylene as monomers albeit in different proportions.

The input (feed) for the second polymerization (preferably taking place in a second reactor) is the same as the feed described above in the second polymerization of the series process, with at least one significant difference, which is that the feed does not include any first polymer. Another difference is that dienes are preferably added to the second polymerization zone, e.g., reactor. The feed for the second polymerization can include, for example, monomers (ethylene and an α-olefin), catalyst mixture and solvent. The output or effluent (e.g., polymerization product) is ethylene polymer, catalyst, solvent and unreacted monomer, e.g., ethylene monomer.

For a particular plant design, the plant productivity is controlled by the bottleneck presented by the recycle system. For example, a parallel reactor operation will typically require the recycling of larger amounts of solvent than for an equivalent amount of polymer with the same polysplit as series reactor operation. Also, a parallel reactor operation will permit wider variation in the residence time and reactor conditions than series reactor operation. In series reactor operation the residence time in the second reactor can be decreased over that in the first reactor by adding additional solvent to the second reactor up to the capacity limit for recycling the solvent. With parallel reactors the residence time of each reactor can be chosen independently as long as the total solvent flow does not exceed the recycle capacity.

The use of different polymerization temperatures is also an important feature of the parallel process, and the discussion above for series reactors applies equally to the parallel system. Also, the discussion above relating to reaction pressures used in series reactor processes applies to parallel processes in the same manner. Further, all discussion of residence time for series reactors also applies to parallel reactors.

Effluent Streams. As discussed elsewhere herein, during operation of the continuous process, each reactor experiences polymerization that produces an effluent stream. That effluent stream can be composed of polymer produced from the polymerization as well as catalyst and any unreacted monomers. Each effluent stream can be characterized as having a particular polymer concentration. As an example, the polymer concentration in the effluent of each reactor can be maintained in the range of 1 to 30% by weight or between 3 to 20% by weight, based on the total weight of the particular effluent. In parallel reactors, there can be three effluent streams, i.e., one from each reactor and the combined effluent stream. The polymer concentration of the effluent from each of the two reactors preferably represents the polymer made in that reactor alone (which can be measured, for example, by separating the formed polymer from non-polymer materials). Polymer concentration of the combined effluent represents all the polymer material present in the two reactors, measured at a given time, e.g., after a particular residence time or some other set point. That polymer material includes at least the reactor blend, which may include a certain amount of the propylene polymer together with at least one other polymer, e.g., an ethylene polymer or a reaction product of the other reactants themselves, e.g., the monomers, or both forms of reactant product. Although other polymer concentrations or ranges of concentrations may in certain cases be utilized, it is preferred that the first effluent polymer concentration range from a low of 1 wt. %, or 2 wt. %, or 3 wt. %, or 4 wt. %, or 5 wt. %, or 6 wt. %, to a high of 30 wt. %, or 25 wt. %, or 20 wt. %, or 16 wt. %, or 12 wt. %, or 8 wt. %. It is preferred that the combined effluent polymer concentration range from a low of 3 wt. %, or 4 wt. %, or 5 wt. %, or 6 wt. %, or 7 wt. %, or 8 wt. %, to a high of 30 wt. %, or 25 wt. %, or 20 wt. %, or 18 wt. %, or 16 wt. %, or 14 wt. %.

Polymer Recovery. A polymer can be recovered from the effluent of either reactor or the combined effluent, by separating the polymer from other constituents of the effluent. Conventional separation means may be employed. For example, polymer can be recovered from effluent by coagulation with a nonsolvent such as isopropyl alcohol, acetone, or n-butyl alcohol, or the polymer can be recovered by stripping the solvent or other media with heat or steam. One or more conventional additives such as antioxidants can be incorporated in the polymer during the recovery procedure. Possible antioxidants include phenyl-beta-naphthylamine; di-tert-butylhydroquinone, triphenyl phosphate, heptylated diphenylamine, 2,2'-methylene-bis(4-methyl-6-tert-butyl)phenol, and 2,2,4-trimethyl-6-phenyl-1,2-dihydroquinoline. Other methods of recovery such as by the use of LCST followed by devolatilization are also envisioned.

Polymerization Rates. For an adiabatic reactor using feed chilling as the method of heat removal, the overall polymerization rate of parallel reactors is set by the difference between the temperature of each reactor and the feed temperature. Since refrigeration is limited by the availability of commercial refrigeration units that are capable of chilling the feed to about −40° C., the economics is driven by the highest temperature at which the two reactors can be operated and still produce the polymer with desired properties such as molecular weight and long chain branching. Other factors that influence polymerization rate (also called production rate) are solvent type and rate, monomer type and polymer composition since the heat of polymerization varies with the choice of monomer.

Molecular Weight. The molecular weight characteristics (e.g., Mw, Mn, etc.) of the reactor blend and also of the individual-propylene polymer and ethylene polymer (polymer components) can in certain circumstances be adjusted depending upon the desired properties of the reactor blend. Those molecular weight characteristics are described elsewhere herein. For example, the molecular weight characteristics of each polymer can be set by choosing the reactor temperature, monomer concentration, and by optionally adding chain transfer agents such as hydrogen. Also, molecular weight can generally be lowered by increasing reaction temperatures, and raised by increasing monomer concentrations.

I. Polymerization Catalysts

In a broadest form, the compositions can be prepared using any SSC (single sited catalyst). Such a catalyst may be a transition metal complex generally containing a transition metal Groups 3 to 10 of the Periodic Table; and at least one ancillary ligand that remains bonded to the transition metal during polymerization. Preferably the transition metal is used in a reduced cationic state and stabilized by a cocatalyst or activator.

The ancillary ligand may be a structure capable of forming a $\pi$ bond such a cyclopentadienyl type ring structure. The ancillary ligand may also be a pyridinyl or amide ligand. The transition metal is preferably of Group 4 of the Periodic table such as titanium, hafnium or zirconium which are used in polymerization in the $d^0$ mono-valent cationic state and have one or two ancillary ligands as described in more detail hereafter. The important features of such catalysts for coordination polymerization are the ligand capable of abstraction and that ligand into which the ethylene (olefinic) group can be inserted.

The transition metal complex may impose a degree of steric order on the propylene monomer by suitable chirality. Where first polymers of higher molecular weight are desired or higher polymerization temperatures, it is preferable to a non- or weakly coordinated anion (the term non-coordinating anion as used herein includes weakly coordinated anions) as cocatalyst. Alternatively aluminoxanes or complexes incorporating oxy-aluminum moieties may be used.

A precursor for the non-coordinating anion may be used with a transition metal complex supplied in a reduced valency state. The precursor may undergo a redox reaction. The precursor may be neutral, such as a borane complex and form the transition metal cation by abstracting a ligand from it. The precursor may be an ion pair of which the precursor cation, such as a borate, is neutralized and/or eliminated in some manner. The precursor cation may be an ammonium salt as in EP 277 003 and EP 277 004. The precursor cation may be a triphenyl carbonium derivative as in EP 426 637. The non-coordinating anion can be a Group 10-14 complex wherein boron or aluminum is the charge bearing atom shielded by ligands which may be halogenated and especially perfluorinated. Preferably tetra-aryl-substituted Group 10-14 non-carbon element-based anion, especially those that are have fluorine groups substituted for hydrogen atoms on the aryl groups, or on alkyl substituents on those aryl groups.

The non-coordinating anion may be used in approximately equimolar amounts relative to the transition metal complex, such as at least 0.25, preferably 0.5, and especially 0.8 and such as no more than 4, preferably 2 and especially 1.5.

The transition metal complex may be a pyridine amine complex useful for olefin polymerization such as those described in WO 03/040201. The transition metal complex may a fluxional complex which undergoes periodic intramolecular re-arrangement so as to provide the desired interruption of stereoregularity as in U.S. Pat. No. 6,559,262. The transition metal complex may be a stereorigid complex with mixed influence on propylene insertion, see Rieger EP1070087.

Preferably the transition metal complex is a chiral bridged bis cyclopentadienyl derivative having the formula

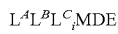

$$L^A L^B L^C_i MDE$$

where $L^A$ and $L^B$ are substituted or unsubstituted cyclopentadienyl or hetero-cyclopentadienyl ancillary ligand π-bonded to M in which the $L^A$ and $L^B$ ligands are covalently bridged together through a Group 14 element linking group; $L^C_i$ is an optional neutral, non-oxidizing ligand having a dative bond to M (i equals 0 to 3); M is a Group 4 or 5 transition metal; and, D and E are independently mono-anionic labile ligands, each having a σ-bond to M, optionally bridged to each other or $L^A$ or $L^B$. The mono-anionic ligands are displaceable by a suitable activator to permit insertion of a polymerizable monomer or macro-monomer can insert for coordination polymerization on the vacant coordination site of the transition metal component.

When using the catalysts, the total catalyst system will generally additionally comprise one or more organo-metallic compound as scavenger. Such compounds as used in this application is meant to include those compounds effective for removing polar impurities from the reaction environment and for increasing catalyst activity.

In at least one embodiment, a polymerization process consists of or includes a polymerization in the presence of a catalyst including a bis(cyclopentadienyl) metal compound and either (1) a non-coordinating compatible anion activator, or (2) an alumoxane activator. Non-limiting examples of catalyst systems which can be used are described in U.S. Pat. Nos. 5,198,401 and 5,391,629. In a particular aspect of this embodiment, an alumoxane activator can be used in an amount to provide a molar aluminum to metallocene ratio of from 1:1 to 20,000:1. In another particular aspect of this embodiment, a non-coordinating compatible anion activator can be used in an amount to provide a molar ratio of biscyclopentadienyl metal compound to non-coordinating anion of from 10:1 to 1:1. In yet another particular aspect of this embodiment, the polymerization reaction is conducted by reacting monomers in the presence of a catalyst system described herein at a temperature of from –0° C. to 200° C. for a time of from 1 second to 10 hours.

In certain embodiments, the propylene polymer of the present invention may be produced in the presence of a chiral metallocene catalyst with an activator and optional scavenger. The use of single site catalysts is preferred to enhance the homogeneity of the polymer. As only a limited tacticity is needed many different forms of single site catalyst may be used. Possible single site catalysts are metallocenes, such as those described in U.S. Pat. No. 5,026,798, which have a single cyclopentadienyl ring, advantageously substituted and/or forming part of a polycyclic structure, and a heteroatom, generally a nitrogen atom, but possibly also a phosphorus atom or phenoxy group connected to a group 4 transition metal, preferably titanium but possibly zirconium or hafnium. A further example is $Me_5CpTiMe_3$ activated with $B(CF)_3$ as used to produce elastomeric polypropylene with an Mn of up to 4 million. See Sassmannshausen, Bochmann, Rosch, Lilge, J. Organomet. Chem. (1997) 548, 23-28.

Other possible single site catalysts are metallocenes which are bis cyclopentadienyl derivatives having a group transition metal, preferably hafnium or zirconium. Such metallocenes may be unbridged as in U.S. Pat. Nos. 4,522,982 or 5,747, 621. The metallocene may be adapted for producing a polymer comprising predominantly propylene derived units as in U.S. Pat. No. 5,969,070 which uses an unbridged bis(2-phenyl indenyl) zirconium dichloride to produce a homogeneous polymer having a melting point of above 79° C. The cyclopentadienyl rings may be substituted and/or part of polycyclic systems as described in the above U.S. patents.

Other possible metallocenes include those in which the two cyclopentadienyl groups are connected through a bridge, generally a single atom bridge such as a silicon or carbon atom with a choice of groups to occupy the two remaining valencies. Such metallocenes are described in U.S. Pat. No. 6,048, 950 which discloses bis(indenyl)bis(dimethylsilyl) zirconium dichloride and MAO; WO 98/27154 which discloses a dimethylsilyl bridged bisindenyl hafnium dimethyl together with a non-coordinating anion activator; EP1070087 which discloses a bridged biscyclopentadienyl catalyst which has elements of asymmetry between the two cyclopentadienyl ligands to give a polymer with elastic properties; and the metallocenes described in U.S. Pat. Nos. 6,448,358 and 6,265,212.

The manner of activation of the single site catalyst can vary. Alumoxane and preferably methyl alumoxane can be used. Higher molecular weights can be obtained using non-or weakly coordinating anion activators (NCA) derived and generated in any of the ways amply described in published patent art such as EP 277 004, EP 426 637, and many others. Activation generally is believed to involve abstraction of an anionic group such as the methyl group to form a metallocene cation, although according to some literature zwitterions may be produced. The NCA precursor can be an ion pair of a borate or aluminate in which the precursor cation is eliminated upon activation in some manner, e.g. trityl or ammonium derivatives of tetrakis pentafluorophenyl boron (See EP 277 004). The NCA precursor can be a neutral compound such as a borane, which is formed into a cation by the abstraction of and incorporation of the anionic group abstracted from the metallocene (See EP 426 638).

J. Specific Catalysts

As noted elsewhere herein, polymerizations in the different reactors may in certain embodiments be conducted in the presence of the same catalyst mixtures, and in other embodiments be conducted in the presence of different catalyst mixtures. As used herein, the term "catalyst mixture" (catalyst system) includes at least one catalyst and at least one activator, although depending on the context, any reference herein to "catalyst" usually also implies an activator as well.

The appropriate catalyst mixture may be delivered to the respective reactor in a variety of ways. For example, it may be delivered as a solution or slurry, either separately to the reactor, activated in-line just prior to the reactor, or preactivated and pumped as an activated solution or slurry to the reactor. Polymerizations are carried out in each reactor, in which reactant components (e.g., desired monomers, comonomers, catalyst/activators, scavengers, and optional modifiers) are preferably added continuously to the appropriate reactor. In some embodiments, both catalyst mixtures are added to the first reactor, while in other embodiments one catalyst mixture is added to the first reactor and a different catalyst mixture is added to the second reactor (although in a sequential operation at least some of the first catalyst mixture from the first reactor may be directed to the second reactor together with the product mixture from the first reactor.

In preferred embodiments, two different catalysts are added as part of different reactant feeds, e.g., a "first catalyst," which may be part of a "first reactant feed," and a "second catalyst," which may be part of a "second reactant feed," although in at least certain embodiments (e.g., series reactors) both first and second catalysts are present to some degree in the second reactor feed, e.g., when the first effluent is supplied to a second reactor. Preferably, in at least certain embodiments, the first catalyst is a chiral catalyst while the second catalyst is a non-chiral catalyst.

In certain embodiments of the processes and compositions, the same catalyst mixture can be used for each of the first and second polymerizations, whether series or parallel. For example, in certain processes, certain catalyst mixtures described in U.S. Pat. No. 6,207,756 can be used in both polymerizations, and that patent is hereby incorporated by reference in its entirety, particularly the portions describing the catalyst mixtures, e.g., column 8 line 20 through column 14, line 21. Preferred catalysts are those that are isospecific.

First Catalyst. The first catalyst is preferably a chiral catalyst. In at least one specific embodiment, the first polymerization is conducted in the presence of a first catalyst that is a "single sited polymerization catalyst," which preferably allows only a single statistical mode of addition of two different monomer sequences, e.g., propylene and ethylene sequences. The first catalyst is preferably well-mixed in a continuous flow stirred tank polymerization reactor, such that it allows only a single polymerization environment for substantially all of the polymer chains of the polymer. That first catalyst is preferably activated, meaning that it is combined in some manner with an activator.

As at least one example, a first catalyst can include a bis(cyclopentadienyl) metal compound and be combined with either (1) a non-coordinating compatible anion activator or (2) an alumoxane activator. (All references herein to "catalysts" preferably include activators as well, unless specified otherwise.) Non-limiting examples of catalyst systems (which include activators) which can be used are described in U.S. Pat. Nos. 5,198,401 and 5,391,629, the disclosures of which are hereby incorporated herein by reference. In a particular aspect of this embodiment, an alumoxane activator can be used in an amount to provide a molar aluminum to metallocene ratio of from 1:1 to 20,000:1. In another particular aspect of this embodiment, a non-coordinating compatible anion activator can be used in an amount to provide a molar ratio of biscyclopentadienyl metal compound to non-coordinating anion of from 10:1 to 1:1. In yet another particular aspect of this embodiment, the polymerization reaction is conducted by reacting monomers in the presence of a catalyst system described herein at a temperature of from –0° C. to 200° C. for a time of from 1 second to 10 hours.

Second Catalyst. The second catalyst (if different than the first catalyst) is preferably a non-chiral catalyst and is also preferably well-mixed in a continuous flow stirred tank reactor. The second catalyst is preferably activated, meaning that it is combined in some manner with an activator. Examples of a second catalyst are set forth elsewhere herein, and are also set forth in WO 00/24793, which is hereby incorporated by reference.

K. First Polymer Component

Preferred embodiments described herein include a first polymer component (FPC) which is preferably a polypropylene component (PPC), which is understood to be totally different than the "propylene polymer" described above. The FPC (e.g., PPC) is physically blended with a reactor blend composition, preferably the reactor blend composition described above (SPC). Preferably, a reactor blend is in pellet form (e.g., is pelletized) before being blended with PPC, which can also be in pellet form before being blended with SPC. Examples of PPCs are propylene homopolymers, propylene copolymers, and mixtures thereof which are commonly known as reactor copolymers (RCPs) or impact copolymers (ICPs). Preferably, reactor copolymers and impact copolymers are contemplated to the extent that all of the components of the PPC are substantially similar in composition and the PPC has the crystallinity levels and melting point described below. In embodiments where the PPC includes a propylene copolymer, the propylene copolymer may be a graft copolymer, block copolymer, or random copolymer.

Preferably, the amount of propylene-derived units present in the PPC is 80 wt. % or higher, or 85 wt. % or higher, or 90 wt. % or higher or 95 wt. % or higher, or 97 wt. % or higher, or even 100 wt. %, based on the total weight of the PPC.

In at least one embodiment, the PPC includes a random copolymer of propylene and at least one comonomer selected from one or more of: ethylene and $C_4$-$C_{12}$ α-olefins. In a particular aspect of this embodiment, the amount of comonomer is within the range having an upper limit of 9 wt. %, or 8 wt. %, or 6 wt. %, and a lower limit of 2 wt. %.

The PPC preferably has a melting point by DSC of at least 110° C. or at least 115° C., or at least 130° C. The PPC of the invention preferably has a heat of fusion, as determined by DSC, of at least 60 J/g, or at least 70 J/g, or at least 80 J/g.

The PPC preferably has a weight average molecular weight ($M_w$) within the range having an upper limit of 5,000,000 g/mol, or 500,000 g/mol, and a lower limit of 10,000 g/mol, or 50,000 g/mol, and a molecular weight distribution $M_w/M_n$ (MWD), sometimes referred to as a "polydispersity index" (PDI), within the range having an upper limit of 40 and a lower limit of 1.5.

The PPC preferably has a melt flow rate (MFR) (determined by the ASTM D1238 technique, condition L) in the range of from 15 to 1500 dg/min, or at least 15, or al least 20 or at least 25 or at least 30 and/or less than 200 dg/min or less than 150 dg/min or less than 100 dg/min.

The PPC may be copolymer of propylene and one or more of the following olefins. Exemplary α-olefins for the rubber portion of the ICP, may be selected from one or more of ethylene; and $C_4$ to $C_{20}$ α-olefins such as butene-1; pentene-1,2-methylpentene-1,3-methylbutene-1; hexene-1,3-methylpentene-1,4-methylpentene-1,3,3-dimethylbutene-1; heptene-1; hexene-1; methylhexene-1; dimethylpentene-1 trimethylbutene-1; ethylpentene-1; octene-1; methylpentene-1; dimethylhexene-1; trimethylpentene-1; ethylhexene-1; methylethylpentene-1; diethylbutene-1; propylpentane-1; decene-1; methylnonene-1; nonene-1; dimethyloctene-1; trimethylheptene-1; ethyloctene-1; methylethylbutene-1; diethylhexene-1; dodecene-1 and hexadodecene-1.

The invention is not limited by any particular method for preparing a PPC of the invention. In one embodiment, the PPC may be a propylene homopolymer obtained by a well known process for the homopolymerization of propylene in a single stage or multiple stage reactor. In another embodiment, the PPC may be a propylene copolymer obtained by a well known process for copolymerizing propylene and one or more comonomers in a single stage or multiple stage reactor.

Polymerization methods for preparing a PPC include high pressure, slurry, gas, bulk, solution phase, and combinations thereof. Catalyst systems that can be used include traditional Ziegler-Natta catalysts and single-site metallocene catalyst systems. In one embodiment, the catalyst used has a high isospecificity.

Polymerization of a PPC may be carried out by a continuous or batch process and may include the use of chain transfer agents, scavengers, or other such additives well known to those skilled in the art. The PPC may also contain additives such as flow improvers, nucleators, and antioxidants which are normally added to isotactic polypropylene to improve or retain properties.

In certain embodiments, the polypropylene component (PPC) is an impact copolymer. Such ICPs are themselves two phase systems, however, each of the two individual phases of the ICP may generally blend with the respective phase of the blend, i.e. crystalline and/or amorphous.

As indicated, an ICP can be in the polypropylene component as part or all of the PPC, used in combinations with the other components of the hetero phase composition. The ICPs have melt flow rates (MFR) of the polypropylene homopolymer portion of the ICP (determined by the ASTM D1238 technique, condition L) in the range of from 15 to 200, or at least 15 and/or less than 120 dg/min. Exemplary α-olefins for the rubber portion of the ICP, may be selected from one or more of ethylene; and $C_4$ to $C_{20}$ α-olefins such as butene-1; pentene-1,2-methylpentene-1,3-methylbutene-1; hexene-1, 3-methylpentene-1,4-methylpentene-1,3,3-dimethylbutene-1; heptene-1; hexene-1; methylhexene-1; dimethylpentene-1 trimethylbutene-1; ethylpentene-1; octene-1; methylpentene-1; dimethylhexene-1; trimethylpentene-1; ethylhexene-1; methylethylpentene-1; diethylbutene-1; propylpentane-1; decene-1; methylnonene-1; nonene-1; dimethyloctene-1; trimethylheptene-1; ethyloctene-1; methylethylbutene-1; diethylhexene-1; dodecene-1 and hexadodecene-1.

Suitably if ethylene is the α-olefin in the rubber phase of the ICP, it may be present in the range of from 25-70 wt. %, or at least 30 and/or less than 65 percent based on the weight of the rubber phase. The rubber phase may be present in the ICP in the range of from 4-65 wt. %, or at least 6 or 10 wt. % and/or less than 18 wt. %, all based on the total weight of the ICP. The MFR of the ICP may be in the range of from 15 to 60, or may be at least 20 and/or less than 50 or less than 40 dg/min. The ICP may be so-called reactor blends.

An ICP may also be a physical blend of polypropylene and one or more elastomeric polymers of the ethylene α-olefin type, generally ethylene propylene elastomeric polymers.

An ICP useful in embodiments of our invention may be prepared by conventional polymerization techniques such as a two-step gas phase process using Ziegler-Natta catalysis. For example, see U.S. Pat. No. 4,379,759 which is fully incorporated by reference. The ICPs of embodiments of our invention are preferably produced in reactors operated in series, and the second polymerization, may be carried out in the gas phase. The first polymerization, may be a liquid slurry or solution polymerization process.

Metallocene catalyst systems may be used to produce the ICP compositions useful in embodiments of our invention. Current particularly suitable metallocenes are those in the generic class of bridged, substituted bis(cyclopentadienyl) metallocenes, specifically bridged, substituted bis(indenyl) metallocenes known to produce high molecular weight, high melting, highly isotactic propylene polymers. Generally speaking, those of the generic class disclosed in U.S. Pat. No. 5,770,753 (fully incorporated herein by reference) should be suitable.

A description of semi-crystalline polypropylene polymers and reactor copolymers can be found in "Polypropylene Handbook", E. P. Moore Editor, Carl Hanser Verlag, 1996.

Other examples, features and properties of PPC useful in the compositions described herein are as follows:

In certain compositions described above or elsewhere herein, the polypropylene having a melting point of 110° C. or more is present in the composition in any one a number of different levels above 70 wt. %, e.g., in the amount of 72 wt. % or more; or 74 wt. % or more; or 75 wt. % or more; or 76 wt. % or more; or 80 wt. % or more; or 85 wt. % or more.

In certain compositions described above or elsewhere herein, the polypropylene having a melting point of 110° C. or more has a Melt Flow Rate of from a lower limit of 20, or 25, or 30, or 35, or 40 g/10 min to an upper limit of 50, or 60, or 70, or 80, or 90, or 100 g/10 min.

In certain compositions described above or elsewhere herein, the polypropylene component is an impact copolymer (ICP) of propylene and an α-olefin, said ICP having one or more of a Tm>115° C., a Δ Hf>60 J/g, or a total α-olefin content of <70 wt. %; said α-olefin being one of ethylene, butene-1,4 methyl-1-pentene, hexene-1, octene-1, decene-1, ondecene-1, dodecene-1 or combinations there of; and wherein said polypropylene component is one of isotactic, syndiotactic, atactic, or combinations thereof.

In certain compositions described above or elsewhere herein, the polypropylene component has one or more of a Tm>125° C., a Δ Hf of >80 J/g, or an α-olefin content of >2 wt. % or <50 wt. %, based on the total weight of said polypropylene component, and wherein said α-olefin being one or more of ethylene, butene-1,4 methyl-1-pentene, hexene-1, octene-1.

In certain compositions described above or elsewhere herein, the polypropylene component has one or more of a Tm>130° C., a Δ Hf of >85 J/g; or an α-olefin content of >2 wt. % or <40 wt. %, based on the total weight of said polypropylene component, and wherein said α-olefin being one or more of ethylene, butene-1, hexene-1, octene-1.

In certain compositions described above or elsewhere herein, the polypropylene component has one or more of a Tm>135° C., a Δ Hf of >90 J/g; or an α-olefin content of >2 wt. % or <30 wt. %, based on the total weight of said, and wherein said α-olefin is ethylene.

In certain compositions described above or elsewhere herein, the polypropylene component is an ICP that has one or more of a Tm>140° C., a Δ Hf of >95 J/g; or an α-olefin content of >2 wt. % or <25 wt. %, based on the total weight of said polypropylene component, said ICP having a molecular weight in the range of from 10,000 to 5,000,000, said ICP having a melt flow rate (MFR), in the range of 15-60 g/10 min; said ICP including a homopolymer polypropylene and rubber, said rubber being present in said ICP in the range of from 4-20 wt. %, based on the total weight of said ICP, said rubber having an α-olefin content of 25-70 wt. %.

In certain compositions described above or elsewhere herein, the polypropylene component has a Tm>110° C. or a Δ Hf >60 J/g, and a polydispersity index (PDI) in the range of from 1-40, and wherein said modifier component is substantially free of propylene crystallinity.

In certain compositions described above or elsewhere herein, the polypropylene component is an impact copolymer (ICP) of propylene and an α-olefin, said ICP having one or more of a Tm>115° C., a Δ Hf>70 J/g, or a total α-olefin content of <70 wt. %; said α-olefin being one of ethylene, butene-1,4methyl-1-pentene, hexene-1, octene-1, decene-1, ondecene-1, dodecene-1 or combinations there of; and wherein said polypropylene component is one of isotactic, syndiotactic, atactic, or combinations thereof.

In certain compositions described above or elsewhere herein, the polypropylene component has one or more of a Tm>125° C., a Δ Hf of >80 J/g, or an α-olefin content of >2 wt. % or <50 wt. %, based on the total weight of said polypropylene component, and wherein said α-olefin being one or more of ethylene, butene-1,4 methyl-1-pentene, hexene-1, octene-1.

In certain compositions described above or elsewhere herein, the polypropylene component has one or more of a Tm>130° C., a Δ Hf of >85 J/g; or an α-olefin content of >2 wt. % or <40 wt. %, based on the total weight of said polypropylene component; and wherein said α-olefin being one or more of ethylene, butene-1, hexene-1, octene-1.

In certain compositions described above or elsewhere herein, the polypropylene component has one or more of a Tm>135° C., a Δ Hf of >90 J/g; or an α-olefin content of >2 wt. % or <30 wt. %, based on the total weight of said, and wherein said α-olefin is ethylene.

In certain compositions described above or elsewhere herein, the polypropylene component has one or more of a Tm>140° C., a Δ Hf of >95 J/g; or an α-olefin content of >2 wt. % or <25 wt. %, based on the total weight of said polypropylene component, said polypropylene component having a molecular weight in the range of from 10,000 to 5,000,000, said polypropylene component having a melt flow rate (MFR), in the range of from 15-60 g/10 min; said ICP including a homopolymer polypropylene and rubber, said rubber being present in said ICP in the range of from 4-20 wt. %, based on the total weight of said ICP, said rubber having an α-olefin content of 25-70 wt. %, said ICP having a PDI in the range of from 1-40 wt. %.

L. Thermoplastic Blend Compositions

Disclosed herein are various blend compositions that include an FPC, e.g., a polypropylene component (PPC), physically blended with a reactor blend that includes a propylene polymer and an ethylene polymer. The reactor blend, including the propylene and ethylene polymers, and the FPC, are each discussed separately below.

Thus, disclosed herein are thermoplastic physical blend compositions that include: a) a first polymer component (FPC) that preferably includes a PPC that is a polypropylene having a melting point (Tm)≧110° C.; and b) a second polymer component (SPC) that preferably is or includes a reactor blend that is preferably any of the reactor blends above and more preferably a reactor blend formed in a solution process, the reactor blend including: (i) a propylene polymer having 60 wt. % or more units derived from propylene, including isotactically arranged propylene derived sequences and Tm<105° C. or a Heat of Fusion<45 J/g, or both; and (ii) an ethylene α-olefin elastomer having either no crystallinity or crystallinity derived from ethylene; wherein: c) the FPC and SPC are physically blended together to form the thermoplastic physical blend composition.

Certain compositions are hard Thermoplastic Olefin (TPO) compositions having a flexural modulus of 100 kpsi or more. Applications (including uses) for those compositions include forming into automotive articles (described elsewhere herein). Examples of such compositions are set forth in the specific embodiments, claims and examples. Typically, in those compositions the FPC is present in the amount of 70 wt. % or more of the total polymers and wherein the composition has an MFR≧25 g/10 min. Alternatively, the FPC can have an MFR of ≧30, or ≧35, or ≧40, or ≧45, or ≧50 g/10 min.

Other compositions disclosed herein are useful for soft applications having a flexural modulus of <100 kpsi. Typically, in those compositions, the FPC is present in the amount of from 40 wt. % to 70 wt. % of the total polymers and wherein the composition has an MFR≦10 g/10 min. Alternatively, the FPC can have an MFR of ≦8, or ≦5, or 3, or 2 g/10 min.

M. Physical Blending Procedures

The physical blends disclosed herein (FPC blended with reactor blend) may be prepared by any appropriate procedure, particularly one that guarantees the intimate admixture of the components. For example, the components (FPC and reactor blend that preferably includes propylene polymer and ethylene polymer) can be combined by melt pressing the components together on a Carver press to a thickness of about 0.5 millimeter (20 mils) and a temperature of about 180° C., rolling up the resulting slab, folding the ends together, and repeating the pressing, rolling, and folding operation about 10 times. Internal mixers are particularly useful for solution or melt blending: Blending at a temperature of about 180° C. to 240° C. in a Brabender Plastograph for about 1 to 20 minutes has been found satisfactory. Still another method that may be used for admixing the components involves blending the polymers in a Banbury internal mixer above the flux temperature of all of the components, e.g., 180° C. for about 5 minutes. The complete admixture of the polymeric components is indicated by the narrowing of the crystallization and melting transitions characteristic of the polypropylene crystallinity of the components to give a single or a small range crystallization and melting points for the blend. These batch mixing procedures are typically supplanted by continuous mixing processes in the industry. These processes are well known in the art and include single and twin screw mixing extruders, static mixers for mixing molten polymer streams of low viscosity, impingement mixers, as well as other machines and processes, designed to disperse the reactor blend and the FPC.

N. Preferred Procedures for Making Reactor Blends

The following methods can be followed in the production of reactor blends of propylene polymers and ethylene polymers where each component of the blend (e.g., the propylene polymer and the ethylene polymer) contains a different ratio of ethylene to propylene.

The method discussed below has the advantage of eliminating the need for a melt blending operation and enables intimate blends of the copolymers to be made in the original reaction medium. Such materials have unique properties because they are not subjected to shear degradation in melt processing equipment. The degree of dispersion of each component of the blend is more intimate.

The propylene polymer should have a low ethylene content, e.g., in the range of 5 to 30%, and preferably in the range of 10 to 15%; is made with a metallocene catalyst in a suitable polymerization reactor vessel. The reaction may be conducted either in a batch mode (batch reactor) or in a continuous mode. Continuous stirred tank reactors are preferred.

The ethylene polymer which is richer in ethylene, preferably contains about 50 to 90% ethylene, and more preferably containing 50 to 75% ethylene, is produced similarly in a second reactor. The products from both reactors are mixed together to obtain the desired blend. The polymer production rate in each reactor is deliberately controlled to provide the precise composition of the blend. This process configuration is referred to herein as parallel reactor configuration.

In another method, the reactors are arranged in a series configuration. In this configuration, the product from the first reactor, along with residual catalyst and residual monomers, is injected into the second reactor. Fresh monomer or monomers are also added to the second reactor, along with additional or different catalyst or catalyst components. The monomer concentrations and operating conditions in the second reactor are modified such that the second polymeric component is made preferentially in this second reactor.

Series reactor configuration provides certain advantages, such as the ability to increase the conversion of the unspent monomers from the first reactor, by further reaction in the second reactor. Carried over active catalyst or catalyst components from the first reactor also enhances the reaction in the second reactor. Parallel reactor configurations are particularly useful when different catalysts that are not mutually compatible for the production of the desired end product are used in the two reactors and/or when the relative monomer feed rates and conversions preclude the use of the series reactor configuration.

In certain methods, the monomers (also called reactants) are dissolved in a hydrocarbon solvent. The hydrocarbon solvent may be one of the monomers or may be an inert solvent. In the preferred method, a solvent, such as pentane, hexane, heptane, octane, or other paraffins, are employed. The solvents may' be used in combination or singly. In some instances, cycloalkanes, or aromatic solvents, such as toluene, may also be used. Such solvents are often selected because they provide a better medium in which to dissolve the catalyst. It is also possible to use mixtures of different types of solvents.

Such processes where the reactions are carried out in a solvent are referred to herein as solution processes. Solution processes provide improved heat transfer and reduce the viscosity of the polymer, thereby making it easier to handle. The monomers are dissolved in a hydrocarbon solvent and this 'mixed-feed' stream is fed to the reactor. Monomers and the solvent can also be fed to the reactor via separate inlets. Catalyst and activator are then introduced into the reactor via an injection port. The activation of the catalyst may be conducted outside the reactor and the activated catalyst complex then introduced into the reactor. In another preferred method, the catalyst components may be injected separately into the reactor, in which case, the activated complex is formed in-situ in the reactor. In certain instances, it may be preferable to inject the catalyst into the mixed feed stream prior to entering the reactor.

Multiple reactors may also be used, such as, for example, two or more reactors in series making copolymer 1, and another set of one or more reactors producing copolymer 2. These two sets may then be operated in series or parallel with each other.

In another configuration, multiple and different copolymers are made in multiple chains, each with a plurality of reactors. The number of such combinations is dictated by the number of different copolymers that form the desired end-product.

In another configuration, one or more, or sometimes all of the individual copolymers are made in slurry reactors. The product and/or the catalyst may be present in concentrations that exceed their solubility in the solvent/s used. The insoluble components of these species then form a slurry in the carrier fluid.

In yet another configuration, the slurry reactor is used to influence the monomer concentration in the proximity of the growing chains, thereby influencing the morphology of the copolymer.

The reactions may be conducted initially or completely, in batch mode, that is, with no flow exiting the reactor until the desired copolymers have been made. In another embodiment, the first copolymer is produced in semi-batch mode, and then the second copolymer is produced in the same reactor or arrangement of reactors, by the addition of similar or different monomers in different proportions, so as to influence the composition and morphology of the copolymer made in the subsequent steps.

In another embodiment, the individual copolymers are produced in a single plug flow reactor or in multiple plug flow reactors arranged in a parallel or series configuration. Plug flow reactors enable addition of different co-monomers and/or different catalyst components at different rates and/or at different locations along the length of the reactor, thereby enabling the production of blends of copolymers.

The catalyst is then deactivated by introducing polar materials, such as water, alcohols, or amines, prior to further downstream purification. The polymeric product that is made is then separated from the carrying medium or solvent by several methods that are known and commonly practiced in industry. In certain methods, the polymer in solution is separated into a polymer-rich or heavy phase and a polymer-poor or lean phase. The pressure and temperature in the separator is adjusted to enhance enrichment of the polymer preferentially in the rich phase. The lighter phase which has very little polymer in it, floats to the top and is removed. The rich phase is then further concentrated by flash evaporation of the solvent before it is fed into a devolatilizing mixer or extruder. A cross-head extruder is mounted at the exit of the devolatizer to further squeeze the polymer through a die plate. In one embodiment of the invention, the polymer is directly extruded through a die plate and pelletized as it leaves the devolatizer. The polymer is cut into little pellets using an under-water pelletizer. The pellets are conveyed to a spin dryer to remove the water. The pellets then make their way into a fluidized bed dryer to remove moisture and other volatile components. The dry product is then packaged for sale. In one embodiment of the invention, a bale press is used to recombine the pellets into large bales, typically weighing 25 pounds to 100 pounds O. Pelletizing Preferably, the compositions described herein (TPO and/or TPV) are formed into pellets. A "pellet" is a term that refers to any article commonly referred to as a pellet, and can take on any of a variety of shapes, including spheres, cylinders and disks. Any device for making pellets can be used, including for example a melt extruder, sometimes a twin screw extruder, which causes the polymeric composition to melt before it is extruded through a die then chopped into small pellets. Illustrative dimensions of the pellets range from about 2 or 3 or 4 mm to 6 or 8 or 10 mm.

In a particularly preferred embodiment, the FPC and/or SPC are each formed into pellets separately before being combined with one another, e.g., by melt blending, and formed into combination pellets. Advantageously, the pellets have reduced tackiness or tendency toward agglomeration but yet retain desirable end-use properties such as softness and flexibility.

A particularly advantageous feature of processes disclosed herein is the formation of SPC pellets with desirable properties, e.g., that are flexible and soft with reduced tackiness, e.g., having a flexural modulus (1% Secant) of $\leq$4.5 MPa (100 kpsi), or $\leq$3.1 MPa (90 kpsi), or $\leq$1.6 MPa (80 kpsi), or $\leq$0.2 MPa (70 kpsi). SPC pellets can be provided with particular proportions of propylene polymer and ethylene polymer so to have such properties. Then SPC pellets can be physically combined with effective amounts of FPC, e.g., in a melt blending operation, to form combination pellets. The combination pellets can be designed so to be either soft, having a flexural modulus within one of the ranges of flexural modulus noted above for the SPC pellets, but slightly higher than the SPC flexural modulus, e.g., a flexural modulus of ≦5% or ≦10% or ≦20% or more. A sufficient amount of FPC should be used in combination with SPC without exceeding the overall desired flexural modulus. Alternatively, the combination pellets can be designed to be hard, having a flexural modulus (1% Secant)>14.5 MPa (100 kpsi), or >16.0 MPa (110 kpsi), or >17.4 MPa (120 kpsi), or >18.9 MPa (130 kpsi), or >20.3 MPa (140 kpsi).

Also, the SPC pellets can have a Shore A Hardness (ASTM 2240) of ≦90, or ≦85, or ≦80; and combination pellets (SPC physically blended with FPC) having Shore A Hardness (ASTM 2240) slightly higher, e.g., ≦100.

In certain embodiments, the pellets (SPC pellets or combination pellets, or both) are dusted with a material different from either the SPC or the FPC, e.g., anti-stick agent materials. Examples of anti-stick material includes powder. More particularly, illustrative examples include waxes, polyethylenes, polypropylenes, talc, calcium stearate, and mixtures thereof, can be included in the amount of 100 parts per million (ppm) or above, or 500 ppm or above, or 1000 ppm or above; to a high of 4000 ppm or below; or 5000 ppm or below; or 7000 ppm or below; or 8000 ppm or below.

In one or more of the embodiments, pellets are formed from compositions that include (preferably added before the pellets are being formed) one or more additives, including additives selected from the listing set forth elsewhere herein. Examples of additives are fire retardants, antioxidants, plasticizers, pigments, vulcanizing or curative agents, vulcanizing or curative accelerators, cure retarders, processing aids, flame retardants, tackifying resins, flow improvers, anti-blocking agents, coloring agents, lubricants, mold release agents, nucleating agents, reinforcements and fillers (including granular, fibrous, or powder-like fillers).

Pelletizing is preferably undertaken after blending (discussed above) is completed.

P. Useful Articles

Preferred compositions herein are particularly useful for automotive applications, preferably for making molded high impact automotive parts such as car bumpers, e.g., bumper fascia. These compositions are blends, preferably physical blends, which have high impact and improved ductility.

Examples of automotive articles that can be made from one or more of the compositions described above or elsewhere herein include exterior or interior car components. More specific embodiments of such automotive articles include bumper fascia, fender liners, wheel well covers, body side moldings, pillar trim, door trim panels, consoles, instrument panel end-caps, instrument panel trims, airbag covers, glove box bins, rear quarter panels, lift gate panels, seat back covers, airbag components, airbags, instrument panel covers, dash board skins, air dams and headliner cartridges.

It has been observed that certain compositions described above and elsewhere herein have improved processability, and also improved mechanical properties, particularly compositions that contain high levels of isotactic polypropylene, e.g., above 70 wt. %. Generally speaking, one of the problems with adding more isotactic polypropylene to any thermoplastic composition is a noticeable drop in ductility. For example, any improvement in a mechanical or impact property such as Notched Izod tends to be accompanied by an undesirably high loss of flexibility, e.g., flexural modulus. Such a trade-off is of great concern for the makers of automotive parts, particular car bumpers. Certain compositions described above provide a combination of: (a) high Notched Izod together with (b) high flexural modulus. In addition to having superior mechanical properties, the compositions also have desirable molding properties, e.g., sufficiently high MFR, without losing their superior impact strength and flexibility.

Certain compositions described above or elsewhere herein include one or more additives; or one or more additives selected from the group consisting of a lubricant, antistatic agent, slip agent, anti-block agent, colorant, metal deactivator, mold release agent, filler, reinforcement, fluorescent whitening agent and biostabilizer. In certain compositions described above or elsewhere herein, the composition includes a pigment, which may in certain compositions be one or more colored pigments.

In certain instances, highly amorphous, very low density ethylene-propylene copolymers (EP) or ethylene-propylene-diene terpolymers (EPDM) have been used as the modifier component in TPOs or TPVs. Those EP or EPDMs may tend to have a high viscosity expressed in Mooney units. One of the markets for TPOs is automotive parts, especially bumper fascia. Other applications include automotive interior components such as door skin, air bag cover, side pillars and the like. These parts are generally made using an injection molding processes. In forming those parts, there is an ongoing need not only for desirable mechanical properties, e.g., impact strength and flexibility, but also for processability, e.g., in connection with molding times and wall thicknesses in the molds. A variety of approaches have been taken to achieve those goals, as disclosed in various publications and patents, including those listed on the cover of this patent.

Q. Thermoplastic Vulcanizates (TPVs)

As noted above, the thermoplastic vulcanizate (TPV) composition includes a first polymer component (FPC), preferably one of PPCs identified above, that includes polypropylene having a melting point (Tm)≧110° C. preferably in an amount of from 20 to 95 wt. % based on the total polymer. The TPV also includes a second polymer component (SPC), preferably in an amount of from 80 to 5 wt. % based on the total polymer content, that includes a reactor blend obtainable from a solution process. The reactor blend can be in various embodiments one of the reactor blends described above, but preferably includes: (i) from 2 to 98% based on the total weight of the SPC of a propylene polymer having 60 wt. % or more units derived from propylene, including isotactically arranged propylene derived sequences and Tm<105° C. or a Heat of Fusion<45 J/g, or both; and (ii) from 98 to 2 wt. % based on the total weight of the SPC of an ethylene α-olefin elastomer having either no crystallinity or crystallinity derived from ethylene. The TPV also includes a dispersed at least partially vulcanized rubber component (described below) and additive oil (also described below). Significantly, in a preferred embodiment, the FPC and the SPC are physically blended together to form the TPV composition.

The term "thermoplastic vulcanizate composition" (also referred to as simply thermoplastic vulcanizate or TPV) is broadly defined as any material that includes a dispersed, at least partially vulcanized, rubber component; a thermoplastic resin component; and an additive oil. A TPV material may further include other ingredients, other additives, or both.

The term "vulcanizate" means a composition that includes some component (e.g., rubber component) that has been vulcanized. The term "vulcanized" is defined herein in its broadest sense, as reflected in any issued patent, printed publication, or dictionary, and refers in general to the state of a composition after all or a portion of the composition (e.g., crosslinkable rubber) has been subjected to some degree or amount of vulcanization. Accordingly, the term encompasses both partial and total vulcanization. A preferred type of vulcanization is "dynamic vulcanization," discussed below, which also produces a "vulcanizate." Also, in at least one specific embodiment, the term vulcanized refers to more than insubstantial vulcanization, e.g., curing (crosslinking) that results in a measurable change in pertinent properties, e.g., a change in the melt flow index (MFI) of the composition by 10% or more (according to any ASTM-1238 procedure). In at least that context, the term vulcanization encompasses any form of curing (crosslinking), both thermal and chemical, that can be utilized in dynamic vulcanization.

The term "dynamic vulcanization" means vulcanization or curing of a curable rubber blended with a thermoplastic resin under conditions of shear at temperatures sufficient to plasticize the mixture. In at least one embodiment, the rubber is simultaneously crosslinked and dispersed as micro-sized particles within the thermoplastic resin component. Depending on the degree of cure, the rubber to thermoplastic resin component ratio, compatibility of the rubber and thermoplastic resin component, the kneader type and the intensity of mixing (shear rate), other morphologies, such as co-continuous rubber phases in the plastic matrix, are possible.

As the term is used herein, a "partially vulcanized" rubber is one wherein more than 5 wt. % of the crosslinkable rubber is extractable in boiling xylene, subsequent to vulcanization (preferably dynamic vulcanization), e.g., crosslinking of the rubber phase of the thermoplastic vulcanizate. For example, at least 5 wt. % and less than 20 wt. % or 30 wt. % or 50 wt. % of the crosslinkable rubber may be extractable from the specimen of the thermoplastic vulcanizate in boiling xylene. The percentage of extractable rubber can be determined by the technique set forth in U.S. Pat. No. 4,311,628.

Preferably, the percent of soluble rubber in the cured composition is determined by refluxing a specimen in boiling xylene, weighing the dried residue and making suitable corrections for soluble and insoluble components based upon knowledge of the composition. Thus, corrected initial and final weights are obtained by subtracting from the initial weight the weight of the soluble components, other than the rubber to be vulcanized, such as extender oils, plasticizers and components of the compositions soluble in organic solvent, as well as that rubber component that it is not intended to cure. Any insoluble pigments, fillers, etc., are subtracted from both the initial and final weights. Any materials in the uncured rubber that are soluble in refluxing xylene are subtracted from the rubber when calculating the percent of soluble rubber in a cured composition, up to about 5 wt. %, typically between about 0.5 to about 2.0 wt. %, of EPDM rubber is soluble in refluxing xylene.

A "fully vulcanized" (or fully cured or fully crosslinked) rubber is one wherein less than 5 wt. % of the crosslinkable rubber is extractable in boiling xylene subsequent to vulcanization (preferably dynamic vulcanization), e.g., crosslinking of the rubber phase of the thermoplastic vulcanizate. Preferably, 4 wt. % or less, or 3 wt. % or less, or 2 wt. % or less, or 1 wt. % or less of the crosslinkable rubber is extractable in boiling xylene.

Rubber component. In one or more embodiments, the rubber component contains an ethylene copolymer rubber. The "ethylene copolymer rubber" may be any ethylene-containing rubber such as ethylene-propylene copolymer rubber (EPR), ethylene-propylene-diene (EPDM) rubber, and EPDM-type rubbers, for example. An EPDM-type rubber can be a terpolymer derived from the polymerization of ethylene and at least one different monoolefin monomer having from 3 to 10 carbon atoms, preferably 3 to 4 carbon atoms, and at least one poly-unsaturated olefin having from 5 to 20 carbon atoms. Those monoolefins desirably have the formula $CH_2=CH-R$ where R is H or an alkyl of 1-12 carbon atoms and is preferably propylene. Desirably the repeat units from ethylene and the at least one monoolefin (and preferably from ethylene and propylene) are present in the polymer in weight ratios of 25:75 to 75:25 (ethylene:propylene) and constitute from about 90 to about 99.6 wt. % of the polymer. The polyunsaturated olefin can be a straight chained, branched, cyclic, bridged ring, bicyclic, fused ring bicyclic compound etc., and preferably is a nonconjugated diene. Repeat units from the nonconjugated polyunsaturated olefin are preferably from about 0.4 to about 10 wt. % of the rubber.

Thermoplastic resin component. In one or more embodiments, the thermoplastic resin component includes an olefinic thermoplastic resin. The "olefinic thermoplastic resin" may be any material that is not a "rubber" and that is a polymer or polymer blend considered by persons skilled in the art as being thermoplastic in nature, e.g., a polymer that softens when exposed to heat and returns to its original condition when cooled to room temperature. The olefinic thermoplastic resin component may contain one or more polyolefins, including polyolefin homopolymers and polyolefin copolymers. Except as stated otherwise, the term "copolymer" means a polymer derived from two or more monomers (including terpolymers, tetrapolymers, etc.), and the term "polymer" refers to any carbon-containing compound having repeat units from one or more different monomers. The thermoplastic resin component is preferably FPC or SPC, and more preferably a physical blend of FPC and SPC.

Illustrative polyolefins may be prepared from mono-olefin monomers including, but are not limited to, monomers having 2 to 7 carbon atoms, such as ethylene, propylene, 1-butene, isobutylene, 1-pentene, 1-hexene, 1-octene, 3-methyl-1-pentene, 4-methyl-1-pentene, 5-methyl-1-hexene, mixtures thereof and copolymers thereof with (meth)acrylates and/or vinyl acetates. Preferably, the olefinic thermoplastic resin component is unvulcanized or non cross-linked.

Additive oil. The term "additive oil" includes both "process oils" and "extender oils." For example, "additive oil" may include hydrocarbon oils and plasticizers, such as organic esters and synthetic plasticizers. Many additive oils are derived from petroleum fractions, and have particular ASTM designations depending on whether they fall into the class of paraffinic, naphthenic, or aromatic oils. Other types of additive oils include α-olefinic synthetic oils, such as liquid polybutylene, e.g., products sold under the trademark Parapol®. Additive oils other than petroleum based oils can also be used, such as oils derived from coal tar and pine tar, as well as synthetic oils, e.g., polyolefin materials (e.g., SpectraSyn™, supplied by ExxonMobil Chemical Company). Certain rubber components (e.g., EPDMs, such as Vistalon 3666) include additive oil that is preblended before the rubber component is combined with the thermoplastic. The type of additive oil utilized will be that customarily used in conjunction with a particular rubber component.

The ordinarily skilled chemist will recognize which type of oil should be used with a particular rubber, and also be able to determine the amount (quantity) of oil. The additive oil can be present in amounts from about 5 to about 300 parts by weight per 100 parts by weight of the blend of the rubber and isotactic polypropylene components. The amount of additive oil may also be expressed as from about 30 to 250 parts, and more desirably from about 70 to 200 parts by weight per 100 parts by weight of the rubber component. Alternatively, the quantity of additive oil can be based on the total rubber content, and defined as the ratio, by weight, of additive oil to total rubber and that amount may in certain cases be the combined amount of process oil (typically added during manufacturing of TPV before and/or after curing the rubber) and extender oil (typically added in the rubber during its manufacturing). The ratio may range, for example, from about 0 to about 4.0/1. Other ranges, having any of the following lower and upper limits, may also be utilized: a lower limit of 0.1/1, or 0.6/1, or 0.8/1, or 1.0/1, or 1.2/1, or 1.5/1, or 1.8/1, or 2.0/1, or 2.5/1; and an upper limit (which may be combined with any of the foregoing lower limits) of 4.0/1, or 3.8/1, or 3.5/1, or 3.2/1, or 3.0/1, or 2.8/1. Larger amounts of additive oil can be used, although the deficit is, often reduced physical strength of the composition, or oil weeping, or both.

Rubber curing agent. Any curative that is capable of curing or crosslinking the rubber component may be used. Depending on the rubber employed, certain curatives may be preferred. Illustrative curatives include, but are not limited to, phenolic resins, peroxides, maleimides, sulfur containing curatives, and silicon-containing curatives. Illustrative phenolic resins are described in U.S. Pat. Nos. 2,972,600; 3,287, 440; 4,311,628; and 6,433,090. A preferred phenolic resin curative is an octylphenol-formaldehyde resin sold commercially as SP-1045 from Schenectady International, Inc. Illustrative peroxide curatives are disclosed in U.S. Pat. No. 5,656, 693. Useful silicon-containing curatives include silicon hydride compounds having at least two SiH groups. Illustrative silicon hydride compounds include, but are not limited to, methylhydrogen polysiloxanes, methylhydrogen dimethylsiloxane copolymers, alkyl methyl polysiloxanes, bis(dimethylsilyl)alkanes, bis(dimethylsilyl)benzene, and mixtures thereof.

Other additives. The term "other additives" may include, but is not limited to, particulate fillers, lubricants, antioxidants, antiblocking agents, stabilizers, anti-degradants, antistatic agents, waxes, foaming agents, pigments, flame retardants, processing aids, adhesives, tackifiers, plasticizers, wax, and discontinuous fibers (such as world cellulose fibers). Exemplary particulate fillers are carbon black, silica, titanium dioxide, calcium carbonate, colored pigments, clay, and combinations thereof. When non-black fillers are used, it may be desirable to include a coupling agent to compatibilize the interface between the non-black fillers and polymers. Desirable amounts of carbon black, or other colorants, when present, are from about 5 to about 250 parts by weight per 100 parts by weight of rubber.

Additional Embodiments of the Present Invention Include:

1. A process for forming a physical blend composition, comprising: physically combining a first polymer component (FPC) that includes polypropylene having a melting point (Tm)≧110° C. with a second polymer component (SPC) that includes a reactor blend formed in a solution process, the reactor blend including: (i) a propylene polymer having 60 wt. % or more units derived from propylene, including isotactically arranged propylene derived sequences and Tm<105° C. or a Heat of Fusion<45 J/g, or both; and (ii) an ethylene α-olefin elastomer having either no crystallinity or crystallinity derived from ethylene, to form a physical blend comprising FPC and SPC.

2. A process for forming a physical blend composition, comprising:
   a) forming in a solvent a propylene polymer having 60 wt. % or more units derived from propylene, including isotactically arranged propylene derived sequences and Tm<105° C. or a Heat of Fusion<45 J/g, or both;
   b) forming in a solvent an ethylene α-olefin elastomer having either no crystallinity or crystallinity derived from ethylene;
   c) forming in a solvent a product mixture that includes the propylene polymer and the ethylene elastomer;
   d) removing solvent from the product mixture to provide a second polymer component (SPC) that includes the propylene polymer and the ethylene elastomer; and
   e) supplying the SPC to be physically blended with a first polymer component (FPC) to form a physical blend composition that includes SPC and FPC, wherein the FPC includes polypropylene having a melting point (Tm)≧110° C.

3. A process for forming a physical blend composition, comprising:
   a) forming in a solvent a propylene polymer having 60 wt. % or more units derived from propylene, including isotactically arranged propylene derived sequences and Tm<105° C. or a Heat of Fusion<45 J/g, or both;
   b) forming in a solvent an ethylene α-olefin elastomer having either no crystallinity or crystallinity derived from ethylene;
   c) forming in a solvent a product mixture that includes the propylene polymer and the ethylene elastomer;
   d) removing solvent from the product mixture to provide a second polymer component (SPC) that includes the propylene polymer and the ethylene elastomer;
   e) physically combining the SPC with a first polymer component (FPC) that includes polypropylene having a melting point (Tm)≧110° C. to form a physical blend composition comprising FPC and SPC; and
   f) forming pellets comprising the physical blend composition.

4. A thermoplastic physical blend composition, comprising:
   a) from 20 to 95 wt. % based on the total polymer content of a first polymer component (FPC) that includes polypropylene having a melting point (Tm)≧110° C.; and
   b) from 80 to 5 wt. % based on the total polymer content of a second polymer component (SPC) that includes a reactor blend obtainable from a solution process, the reactor blend including: (i) from 2 to 98 wt. % based on the total weight of the SPC of a propylene polymer having 60 wt. % or more units derived from propylene, including isotactically arranged propylene derived sequences and Tm<105° C. or a Heat of Fusion<45 J/g, or both; and (ii) from 98 to 2 wt. % based on the total weight of the SPC of an ethylene α-olefin elastomer having either no crystallinity or crystallinity derived from ethylene, wherein the FPC and the SPC are physically blended together to form the composition.

5. The process of claim 1 additionally comprising forming SPC pellets, which include the SPC, prior to physically combining the SPC with the FPC.

6. The process of claim 1 additionally comprising forming SPC pellets, which include the SPC, prior to supplying the SPC to be physically blended with the FPC.

7. The process of claim 1 additionally comprising (a) forming SPC pellets, which include the SPC, prior to physically combining the SPC with the FPC, and (b) forming combination pellets, which include both SPC and FPC, after physically combining the SPC with the FPC.

8. The process of claim 1 additionally comprising (a) forming SPC pellets, which include the SPC, prior to physically combining the SPC with the FPC, and (b) forming combination pellets, which include both SPC and FPC, after physically combining the SPC with the FPC, wherein the SPC pellets are soft, having a flexural modulus (1% Secant) ≦100 kpsi and the combination pellets are hard, having a flexural modulus (1% Secant)>100 kpsi.

9. The process of claim 1 additionally comprising (a) forming SPC pellets, which include the SPC, prior to physically combining the SPC with the FPC, and (b) forming combination pellets, which include both SPC and FPC, after physically combining the SPC with the FPC, wherein both the SPC pellets and the combination pellets are soft, having a flexural modulus (1% Secant)≦100 kpsi.

10. The blend composition of claim 4 wherein the ethylene α-olefin elastomer is present in the reactor blend in an amount of more than 50 wt. % based on the total weight of the SPC.

11. The blend composition according to claim 4 or 10 wherein the SPC has two phases and is not homogeneous.

12. The blend composition according to any of claims 4, 10, or 11 wherein the ethylene content of the ethylene α-olefin elastomer is from 45 to 75 wt. %.

13. The blend composition according to any of claims 4 or 10-12 wherein the FPC is isotactic polypropylene homopolymer, a reactor copolymer, or an impact copolymer.

14. The blend composition according to any of claims 4 or 10-13 further comprising one or more other polymers, wherein the combination of the FPC and the SPC is present in the amount of from 80 to 100 wt. % of the blend composition based on the total polymer weight.

15. The blend composition according to any of claims 4 or 10-14 further comprising a filler, or a plasticizer, or both.

16. The blend composition according to any of claims 4 or 10-15 wherein the FPC is present in the physical blend composition in an amount of 50 wt. % or more based on the total polymer content.

17. The blend composition according to any of claims 4 or 10-15 wherein the FPC is present in the physical blend composition in an amount of less than 50 wt. % based on the total polymer content.

18. The blend composition according to any of claims 4 or 10-17 in which either the FPC or the SPC, or both, further include units derived from a diene.

19. The blend composition according to any of claims 4 or 10-18 wherein the propylene polymer of the SPC is an ethylene propylene copolymer having 60 wt. % or more units derived from propylene and 40 wt. % or less units derived from ethylene.

20. The blend composition according to any of claims 4 or 10-19 wherein the ethylene elastomer of the SPC is an amorphous ethylene propylene copolymer.

21. The blend composition according to any of claims 4 or 10-20 wherein the composition has multiple phases.

22. The blend composition according to any of claims 4 or 10-21 wherein the reactor blend is formed in a continuous process.

23. The blend composition according to any of claims 4 or 10-21 wherein the reactor blend is formed in a series process.

24. The blend composition according to any of claims 4 or 10-21 wherein the reactor blend is formed in a parallel process.

25. The blend composition according to any of claims 4 or 10-24 having a flexural modulus (1% secant)≧100 kpsi.

26. The blend composition of claim 25 wherein the FPC is present in the amount of 70 wt. % or more of the total polymers and wherein the composition has an MFR≧25 g/10 min.

27. The blend composition of claim 25 wherein the SPC is present in the amount of 30 wt. % or less of the total polymers and wherein the composition has an MFR≧25 g/10 min.

28. The blend composition of claim 25 wherein the propylene polymer is present in the amount of from 1 wt. % to 10 wt. % of the total polymers.

29. The blend composition of claim 25 wherein the ethylene elastomer is present in the amount of from 20 wt. % to 35 wt. % of the total polymers.

30. The blend composition according to any of claims 25-29 wherein the MFR of the FPC≧250 g/10 min.

31. The blend composition of claim 25 having a Notched Izod @ 21° C.≧22.5.

32. The blend composition according to any of claims 4 or 10-24 having a flexural modulus (1% secant)<100 kpsi.

33. The blend composition of claim 32 wherein the FPC is present in the amount of from 40 wt. % to 70 wt. % of the total polymers and wherein the composition has an MFR≦10 g/10 min.

34. The blend composition of claim 32 wherein the SPC is present in the amount of from 60 wt. % to 30 wt. % of the total polymers and wherein the composition has an MFR≦10 g/10 min.

35. The composition of claim 32 wherein the propylene polymer is present in the amount of from 10 wt. % to 40 wt. % of the total polymers.

36. The composition of claim 32 wherein the ethylene elastomer is present in the amount of from 20 wt. % to 50 wt. % of the total polymers.

37. The composition according to any of claims 32-36 wherein the MFR of the FPC≦10 g/10 min.

38. The composition according to any of claims 32-36 having a Tensile Strength of ≧1000 psi.

39. The composition according to any of claims 32-36 having a Hysterisis of ≦25%.

40. A thermoplastic vulcanizate composition, comprising:
   a) from 20 to 95 wt. % based on the total polymer content of a first polymer component (FPC) that includes polypropylene having a melting point (Tm)≧110° C.;
   b) from 80 to 5 wt. % based on the total polymer content of a second polymer component (SPC) that includes a reactor blend obtainable from a solution process, the reactor blend including: (i) from 2 to 98 wt. % based on the total weight of the SPC of a propylene polymer having 60 wt. % or more units derived from propylene, including isotactically arranged propylene derived sequences and Tm<105° C. or a Heat of Fusion<45 J/g, or both; and (ii) from 98 to 2 wt. % based on the total weight of the SPC of an ethylene α-olefin elastomer having either no crystallinity or crystallinity derived from ethylene;
   c) a dispersed at least partially vulcanized rubber component; and
   d) an additive oil; wherein the FPC and the SPC are physically blended together.

41. The composition of claim 40, in which the FPC and SPC are melt blended together to form pellets.

42. The composition of claims 40 or 41 in which the Shore A Hardness of the composition is 90 or below.

43. The composition of claims 40 or 41 in which the Shore A Hardness of the composition is above 90.

44. The composition according to any of claims 40-43 in which the additive oil occupies less than 20 wt. % of the composition.

45. The composition according to any of claims 40-45 in which the FPC includes isotactic polypropylene having a melting point greater than 110° C.

46. The composition according to any of claims 40-45 in which the rubber component is ethylene-propylene-diene rubber.

47. The composition according to any of claims 40-46 in which the composition is at least partially vulcanized.

What is claimed is:

1. A process for forming a physical blend composition, comprising: physically combining a first polymer component (FPC) that includes polypropylene having a melting point (Tm)≧110° C. with a second polymer component (SPC) that includes a reactor blend formed in a solution process, the reactor blend including: (i) a propylene polymer having 60 wt. % or more units derived from propylene, including isotactically arranged propylene derived sequences and Tm<105° C. or a Heat of Fusion <45 J/g, or both; and (ii) an ethylene α-olefin elastomer having either no crystallinity or crystallinity derived from ethylene, to form a physical blend comprising FPC and SPC.

2. A process for forming a physical blend composition, comprising:
   a) forming in a solvent a propylene polymer having 60 wt. % or more units derived from propylene, including isotactically arranged propylene derived sequences and Tm<105° C. or a Heat of Fusion<45 J/g, or both;
   b) forming in a solvent an ethylene α-olefin elastomer having either no crystallinity or crystallinity derived from ethylene;
   c) forming in a solvent a product mixture that includes the propylene polymer and the ethylene elastomer;
   d) removing solvent from the product mixture to provide a second polymer component (SPC) that includes the propylene polymer and the ethylene elastomer; and
   e) supplying the SPC to be physically blended with a first polymer component (FPC) to form a physical blend composition that includes SPC and FPC, wherein the FPC includes polypropylene having a melting point (Tm)≧110° C.

3. A process for forming a physical blend composition, comprising:
   a) forming in a solvent a propylene polymer having 60 wt. % or more units derived from propylene, including isotactically arranged propylene derived sequences and Tm<105° C. or a Heat of Fusion<45 J/g, or both;
   b) forming in a solvent an ethylene α-olefin elastomer having either no crystallinity or crystallinity derived from ethylene;
   c) forming in a solvent a product mixture that includes the propylene polymer and the ethylene elastomer;
   d) removing solvent from the product mixture to provide a second polymer component (SPC) that includes the propylene polymer and the ethylene elastomer;
   e) physically combining the SPC with a first polymer component (FPC) that includes polypropylene having a melting point (Tm)≧110° C. to form a physical blend composition comprising FPC and SPC; and
   f) forming pellets comprising the physical blend composition.

4. A thermoplastic physical blend composition, comprising:
   a) from 20 to 95 wt. % based on the total polymer content of a first polymer component (FPC) that includes polypropylene having a melting point (Tm)≧110° C.; and
   b) from 80 to 5 wt. % based on the total polymer content of a second polymer component (SPC) that includes a reactor blend formed in a solution process, the reactor blend including:
      (i) from 2 to 98 wt. % based on the total weight of the SPC of a propylene polymer having 60 wt. % or more units derived from propylene, including isotactically arranged propylene derived sequences and Tm<105° C. or a Heat of Fusion<45 J/g, or both; and
      (ii) from 98 to 2 wt. % based on the total weight of the SPC of an ethylene α-olefin elastomer having either no crystallinity or crystallinity derived from ethylene, wherein the FPC and the SPC are physically blended together to form the composition.

5. The process of claim 1 additionally comprising forming SPC pellets, which include the SPC, prior to physically combining the SPC with the FPC.

6. The process of claim 1 additionally comprising forming SPC pellets, which include the SPC, prior to supplying the SPC to be physically blended with the FPC.

7. The process of claim 1 additionally comprising (a) forming SPC pellets, which include the SPC, prior to physically combining the SPC with the FPC, and (b) forming combination pellets, which include both SPC and FPC, after physically combining the SPC with the FPC.

8. The process of claim 1 additionally comprising (a) forming SPC pellets, which include the SPC, prior to physically combining the SPC with the FPC, and (b) forming combination pellets, which include both SPC and FPC, after physically combining the SPC with the FPC, wherein the SPC pellets are soft, having a flexural modulus (1% Secant)≦100 kpsi and the combination pellets are hard, having a flexural modulus (1% Secant)>100 kpsi.

9. The process of claim 1 additionally comprising (a) forming SPC pellets, which include the SPC, prior to physically combining the SPC with the FPC, and (b) forming combination pellets, which include both SPC and FPC, after physically combining the SPC with the FPC, wherein both the SPC pellets and the combination pellets are soft, having a flexural modulus (1% Secant)≦100 kpsi.

10. The blend composition of claim 4 wherein the ethylene α-olefin elastomer is present in the reactor blend in an amount of more than 50 wt. % based on the total weight of the SPC.

11. The blend composition of claim 4 wherein the SPC has two phases and is not homogeneous.

12. The blend composition of claim 4 wherein the ethylene content of the ethylene α-olefin elastomer is from 45 to 75 wt. %.

13. The blend composition of claim 4 wherein the FPC is isotactic polypropylene homopolymer, a reactor copolymer, or an impact copolymer.

14. The blend composition of claim 4 further comprising one or more other polymers, wherein the combination of the FPC and the SPC is present in the amount of from 80 to 100 wt. % of the blend composition based on the total polymer weight.

15. The blend composition of claim 4 further comprising a filler, or a plasticizer, or both.

16. The blend composition of claim 4 wherein the FPC is present in the physical blend composition in an amount of 50 wt. % or more based on the total polymer content.

17. The blend composition of claim 4 wherein the FPC is present in the physical blend composition in an amount of less than 50 wt. % based on the total polymer content.

18. The blend composition of claim 4 in which either the FPC or the SPC, or both, further include units derived from a diene.

19. The blend composition of claim 4 wherein the propylene polymer of the SPC is an ethylene propylene copolymer having 60 wt. % or more units derived from propylene and 40 wt. % or less units derived from ethylene.

20. The blend composition of claim 4 wherein the ethylene elastomer of the SPC is an amorphous ethylene propylene copolymer.

21. The blend composition of claim 4 wherein the composition has multiple phases.

22. The blend composition of claim 4 wherein the reactor blend is formed in a continuous process.

23. The blend composition of claim 4 wherein the reactor blend is formed in a series process.

24. The blend composition of claim 4 wherein the reactor blend is formed in a parallel process.

25. The blend composition of claim 4 having a flexural modulus (1% secant)$\geq$100 kpsi.

26. The blend composition of claim 25 wherein the FPC is present in the amount of 70 wt. % or more of the total polymers and wherein the composition has an MFR$\geq$25 g/10 min.

27. The blend composition of claim 25 wherein the SPC is present in the amount of 30 wt. % or less of the total polymers and wherein the composition has an MFR$\geq$25 g/10 min.

28. The blend composition of claim 25 wherein the propylene polymer is present in the amount of from 1 wt. % to 10 wt. % of the total polymers.

29. The blend composition of claim 25 wherein the ethylene elastomer is present in the amount of from 20 wt. % to 35 wt. % of the total polymers.

30. The blend composition of claim 25 wherein the MFR of the FPC$\geq$50 g/10 min.

31. The blend composition of claim 25 having a Notched Izod@ 21° C.$\geq$2.5.

32. The blend composition of claim 4 having a flexural modulus (1% secant)<100 kpsi.

33. The blend composition of claim 32 wherein the FPC is present in the amount of from 40 wt. % to 70 wt. % of the total polymers and wherein the composition has an MFR$\leq$10 g/10 min.

34. The blend composition of claim 32 wherein the SPC is present in the amount of from 60 wt. % to 30 wt. % of the total polymers and wherein the composition has an MFR$\leq$10 g/10 min.

35. The composition of claim 32 wherein the propylene polymer is present in the amount of from 10 wt. % to 40 wt. % of the total polymers.

36. The composition of claim 32 wherein the ethylene elastomer is present in the amount of from 20 wt. % to 50 wt. % of the total polymers.

37. The composition of claim 32 wherein the MFR of the FPC$\leq$10 g/10 min.

38. The composition of claim 32 having a Tensile Strength of$\geq$1000 psi.

39. The composition of claim 32 having a Hysterisis of$\leq$25%.

* * * * *